United States Patent
Ryu et al.

(10) Patent No.: US 9,619,178 B2
(45) Date of Patent: Apr. 11, 2017

(54) HYBRID STORAGE APPARATUS AND LOGICAL BLOCK ADDRESS ASSIGNING METHOD

(75) Inventors: In-sik Ryu, Suwon-si (KR); Jae-sung Lee, Suwon-si (KR); Se-wook Na, Suwon-si (KR); Byung-wook Kim, Suwon-si (KR)

(73) Assignee: Seagate Technology International, Cupertino, CA (US)

( * ) Notice: Subject to any disclaimer, the term of this patent is extended or adjusted under 35 U.S.C. 154(b) by 2126 days.

(21) Appl. No.: 12/538,286

(22) Filed: Aug. 10, 2009

(65) Prior Publication Data

US 2010/0037017 A1    Feb. 11, 2010

(30) Foreign Application Priority Data

Aug. 8, 2008 (KR) .......................... 10-2008-0078142

(51) Int. Cl.
G06F 3/06 (2006.01)
G06F 11/14 (2006.01)

(52) U.S. Cl.
CPC ............ G06F 3/0664 (2013.01); G06F 3/061 (2013.01); G06F 3/064 (2013.01); G06F 3/0685 (2013.01); G06F 3/0632 (2013.01); G06F 11/1435 (2013.01)

(58) Field of Classification Search
None
See application file for complete search history.

(56) References Cited

U.S. PATENT DOCUMENTS

| | | | | |
|---|---|---|---|---|
| 5,640,592 A | * | 6/1997 | Rao | 710/5 |
| 5,687,390 A | * | 11/1997 | McMillan, Jr. | 710/5 |
| 5,920,733 A | * | 7/1999 | Rao | 710/68 |
| 6,016,527 A | * | 1/2000 | DeMoss | 710/117 |

(Continued)

FOREIGN PATENT DOCUMENTS

| | | |
|---|---|---|
| JP | 06-314177 | 11/1994 |
| JP | 09-297659 | 11/1997 |
| JP | 2007-034536 | 2/2007 |

OTHER PUBLICATIONS

Machine Translation of JP-06-314177.*

(Continued)

Primary Examiner — Kevin Verbrugge
(74) Attorney, Agent, or Firm — Cesari & Reed, LLP; Kirk A. Cesari

(57) ABSTRACT

Hybrid storage apparatus and logical block address assigning methods for the hybrid storage apparatus are provided. A hybrid storage apparatus includes a plurality of storage apparatuses having different writing methods, and a controller to combine the storage apparatuses as a single storage apparatus, to assign one or more logic block addresses to the single storage apparatus, and to access the storage apparatuses using the logic block addresses. The address assigning method of a hybrid storage apparatus includes searching and detecting one or more storage apparatuses included in a hybrid storage apparatus when an initially set condition is generated, combining the storage apparatuses as a single storage apparatus, assigning one or more logic block addresses to the single storage apparatus, and accessing the storage apparatuses using the logic block addresses.

25 Claims, 23 Drawing Sheets

(56) References Cited

U.S. PATENT DOCUMENTS

| | | |
|---|---|---|
| 6,249,838 B1 * | 6/2001 | Kon .................................. 711/103 |
| 6,792,556 B1 * | 9/2004 | Dennis ............................ 714/6.11 |
| 6,862,681 B2 * | 3/2005 | Cheston et al. ..................... 713/2 |
| 7,076,606 B2 * | 7/2006 | Orsley .............................. 711/114 |
| 8,037,240 B2 * | 10/2011 | Joukov ............................. 711/112 |
| 2003/0014619 A1 * | 1/2003 | Cheston et al. ..................... 713/1 |
| 2004/0059869 A1 * | 3/2004 | Orsley .............................. 711/114 |
| 2006/0129373 A1 * | 6/2006 | Georgis ............................. 703/24 |
| 2006/0206665 A1 * | 9/2006 | Orsley .............................. 711/114 |
| 2008/0184025 A1 * | 7/2008 | Dayan et al. ......................... 713/2 |
| 2009/0083484 A1 * | 3/2009 | Basham et al. ................... 711/114 |
| 2009/0109823 A1 * | 4/2009 | Joukov .............................. 369/85 |
| 2009/0132760 A1 * | 5/2009 | Flynn et al. ...................... 711/113 |
| 2009/0240881 A1 * | 9/2009 | Halloush et al. ................ 711/114 |
| 2010/0199036 A1 * | 8/2010 | Siewert et al. ................... 711/112 |
| 2011/0035548 A1 * | 2/2011 | Kimmel et al. ................. 711/114 |

OTHER PUBLICATIONS

Translation of JP 06-314177 to Nagafune, published Nov. 8, 1994.*
Office Action, KR application No. 10-2008-0078142, Filing Date: Aug. 8, 2008, Received May 29, 2015, 4 pages.

* cited by examiner

FIG. 5

|  | NV MEMORY | HDD | PPT 5MB |
|---|---|---|---|
| Case #1 | OS + Application + Data File |  | 2.00 |
| Case #2 | OS + Application | Data File | 2.00 |
| Case #3 | OS | Application + Data File | 2.62 |
| Case #4 | Application | OS + Data File | 2.73 |
| Case #5 | Data File | OS − Application | 2.75 |
| Case #6 |  | OS + Application + Data File | 2.98 |

HYBRID STORAGE APPARATUS AND LOGICAL BLOCK ADDRESS ASSIGNING METHOD

CROSS-REFERENCE TO RELATED APPLICATIONS

This application claims priority under 35 U.S.C. §119(a) from Korean Patent Application No. 10-2008-0078142, filed on Aug. 8, 2008 in the Korean Intellectual Property office, the disclosure of which is incorporated herein in its entirety by reference.

BACKGROUND

1. Field of the Invention

The present general inventive concept relates to digital storage devices and logical block address assigning methods, and, more particularly, to hybrid storage apparatus and logical block address assigning methods for the hybrid storage apparatus.

2. Description of the Related Art

A conventional data storage apparatus is a single data storage apparatus connected to a host apparatus to store or read data according to a command of the host apparatus.

Recently, a hybrid data storage apparatus having a plurality of storage apparatuses has been developed to increase a data processing speed or a data storing capacity. However, such a conventional hybrid data storage apparatus has limitations of its performance and speed since the storage apparatuses are simply structurally connected.

SUMMARY

The present general inventive concept provides hybrid storage apparatus and logical block address assigning methods for the hybrid storage apparatus.

The present general inventive concept also provides storage apparatuses having different writing methods, and combining the storage apparatuses as a single storage apparatus, assigning one or more logic block addresses to the single storage apparatus, and accessing the storage apparatuses using the logic block addresses. The address assigning method of a hybrid storage apparatus includes searching and detecting one or more storage apparatuses included in a hybrid storage apparatus when an initially set condition is generated, combining the storage apparatuses as a single storage apparatus, assigning one or more logic block addresses to the single storage apparatus, and accessing the storage apparatuses using the logic block addresses.

Additional features and utilities of the present general inventive concept will be set forth in part in the description which follows and, in part, will be obvious from the description, or may be learned by practice of the general inventive concept.

Exemplary embodiments of the general inventive concept may be achieved by providing a hybrid storage apparatus including, among other things, a plurality of storage apparatuses having different writing methods, and a controller to combine the storage apparatuses as a single storage apparatus, to assign one or more logic block addresses to the single storage apparatus, and to access the storage apparatuses using the logic block addresses.

The hybrid storage apparatus may further include where the controller assigns upper ones of the logic block addresses to one of the storage apparatuses, and the one of the storage apparatuses has a data transmission speed higher than other one of the storage apparatuses.

The hybrid storage apparatus may further include where the plurality of the storage apparatuses comprise non-volatile storage apparatuses.

The hybrid storage apparatus may further include where the plurality of storage apparatuses comprises a hard disk drive and a non-volatile semiconductor memory apparatus, and the controller assigns upper ones of the logic block addresses to the non-volatile semiconductor memory apparatus and lower ones of the logic block addresses to the hard disk drive.

The hybrid storage apparatus may further include where the controller assigns the upper logic block addresses to storing areas of the non-volatile semiconductor memory apparatus and sequentially assigns the lower logic block addresses to storing areas of the hard disk drive such that a first one of the lower logic block addresses is a next one of the upper logic block addresses.

The hybrid storage apparatus may further include where the controller assigns the upper logic block addresses to the non-volatile semiconductor memory apparatus by mapping physical memory blocks of the storing areas with virtual logic block addresses.

The hybrid storage apparatus may further include where the controller assigns the lower logic block addresses to the hard disk drive by mapping location information of the sectors included in the storing areas of the hard disk drive with virtual logic block addresses.

The hybrid storage apparatus may further include where the controller outputs a signal representing the combined storage apparatuses as the single storage apparatus.

The hybrid storage apparatus may further include where the controller copies information stored in a system file storing area of one of the storage apparatus designated by the upper logic block addresses into an initially set area of one of the storage apparatuses designated by the lower logic block addresses.

The hybrid storage apparatus may further include where the controller detects only one of the storage apparatuses, and copies a system file stored in an initially set area of the detected storage apparatus into a designated system file storing area when the system file is not stored in the designated system file area of the detected storage apparatus, and assigns one or more new logic block addresses to the detected storage apparatus.

The hybrid storage apparatus may further include where the controller detects only one of the storage apparatus, and assigns one or more new logic block addresses to the detected storage apparatus when a system file is stored in a designated system file area of the detected storage apparatus.

The hybrid storage apparatus may further include, among other things, a single host interface to perform receiving and transmitting data between a host apparatus and the plurality of storage apparatuses according to an initially set interface standard.

The hybrid storage apparatus may further include where the plurality of the storage apparatuses comprise a plurality of circuit elements mounted on a single circuit assembly.

The hybrid storage apparatus may further include where the controller and a storage apparatus controller to control at least one of the plurality of storage apparatuses are formed as a single system on chip.

Exemplary embodiments of the general inventive concept may also be achieved by providing an address assigning method of a hybrid storage apparatus, the method including, among other things, searching and detecting one or more storage apparatuses included in a hybrid storage apparatus when an initially set condition is generated, combining the storage apparatuses as a single storage apparatus, assigning one or more logic block addresses to the single storage apparatus, and accessing the storage apparatuses using the logic block addresses.

The address assigning method may further include, among other things copying information stored in a system file storing area of one of the storage apparatus designated by the upper logic block addresses into an initially set area of one of the storage apparatuses designated by the lower logic block addresses, as back-up information.

The address assigning method may further include, among other things, detecting only one of the storage apparatuses to perform a single mode, wherein the single mode includes determining the system file is not stored in the designated system file area of the detected storage apparatus, copying a system file stored in an initially set area of the detected storage apparatus into a designated system file storing area according to the determination that the system file is not stored in the designated system file area of the detected storage apparatus, and assigning one or more new logic block addresses to the detected storage apparatus according to the determination that the system file is stored in a designated system file area of the detected storage apparatus.

The address assigning method may further include where the initially set condition comprises a condition where the data storage apparatus is changed from a power off state to a power on state.

The address assigning method may further include where the initially set condition comprises a condition where the data storage apparatus is reset.

The address assigning method may further include where the plurality of storage apparatuses comprise a non-volatile storage apparatus.

The address assigning method may further include where the assigning of the logic block address comprises assigning the logic block address when the logic block address is not assigned to one of the plurality of storage apparatuses and when one of the storage apparatuses assigned with the logic block address is not detected.

The address assigning method may further include, among other things, assigning upper ones of the logic block addresses to one of the storage apparatuses which has a data transmission speed higher than other one of the storage apparatuses.

The address assigning method may further include where the plurality of the storage apparatuses comprises a hard disk drive and a non-volatile semiconductor memory apparatus, and the assigning comprises assigning upper ones of the logic block addresses to the non-volatile semiconductor memory apparatus and lower ones of the logic block addresses to the hard disk drive.

The address assigning method may further include where the plurality of the storage apparatuses comprises a hard disk drive and a non-volatile semiconductor memory apparatus, and the assigning comprises assigning the upper logic block addresses to storing areas of the non-volatile semiconductor memory apparatus and sequentially assigns the lower logic block addresses to storing areas of the hard disk drive such that a first one of the lower logic block addresses is a next one of the upper logic block addresses.

The address assigning method may further include where assigning the upper logic block addresses to the non-volatile semiconductor memory apparatus by mapping physical memory blocks of the storing areas with virtual logic block addresses.

The address assigning method may further include, among other things, assigning the lower logic block addresses to the hard disk drive by mapping location information of the sectors included in the storing areas of the hard disk drive with virtual logic block addresses.

Exemplary embodiments of the general inventive concept may also be achieved by providing a computer-readable medium to contain computer-readable codes as a program that, when executed by a computer, performs a method of a data storage system, the method including, among other things, searching and detecting one or more storage apparatuses included in a hybrid storage apparatus when an initially set condition is generated, combining the storage apparatuses as a single storage apparatus, assigning one or more logic block addresses to the single storage apparatus, and accessing the storage apparatuses using the logic block addresses.

Exemplary embodiments of the general inventive concept may also be achieved by providing a method of assigning logical block addresses for a hybrid storage system having at least first storage unit having a first storage capacity and a first access data rate, and a second storage unit having a second storage capacity greater than the first storage capacity and a second access data rate that is less than the first access data rate, the method including, among other things, assigning the logical block addresses as a single storage device to the two or more storage units of the hybrid storage system, where an assigned last logical block address of the first storage unit is N, and a first assigned logical block address of the second storage unit is N+1.

Exemplary embodiments of the general inventive concept may also be achieved by providing a method of assigning logical block addresses for a hybrid storage system having one or more digital storage devices, the method including, among other things, determining if there is a single digital storage device in the hybrid storage system having a first digital storage unit having a first data storage capacity and a first operation response time and a second digital storage unit having a second data storage capacity and a second operation response time, where the second data storage capacity is less than the first data storage capacity and the second operation response time is less than the first operation response time, determining if a hybrid storage system file having assigned logical block addresses is stored in the second digital storage unit, and copying the system files from the second digital storage unit to the first digital storage unit, and assigning new logical block addresses to the determined single storage device.

The method of assigning logical block addresses may further include, among other things, storing the newly assigned logical block addresses on the single digital storage device.

Exemplary embodiments of the general inventive concept may also be achieved by providing a hybrid storage system, including, among other things, a first digital storage device having a first data storage capacity and a first operation response time, a second digital storage device having a second data storage capacity and a second operation response time, where the second data storage capacity is less than the first data storage capacity and the second operation response time is greater than the first operation response time, and a storage controller to control the assignment of logical block addresses to the first digital storage device and the second digital storage device, where an assigned last logical block address of the second data storage device is N, and a first assigned logical block address of the first data storage device is N+1.

Exemplary embodiments of the general inventive concept may also be achieved by providing a hybrid storage system, including, among other things, a circuit assembly having a first digital storage device having a first data storage capacity and a first operation response time, the first digital storage device including and a first digital storage device controller, a controller for a second digital storage device, and a storage controller to control the first and second digital storage device controllers, and the second digital storage device having a having a second data storage capacity and a second operation response time, where the second data storage capacity is greater than the first data storage capacity and the second operation response time is less than the first operation response time, where the storage controller is to assign logical block addresses to the first digital storage device and the second digital storage device, where an assigned last logical block address of the second data storage device is N, and a first assigned logical block address of the first data storage device is N+1.

Exemplary embodiments of the general inventive concept may also be achieved by providing a hybrid storage system, including, among other things, an integrated circuit assembly having a first digital storage device having a first data storage capacity and a first operation response time, and a storage controller to control the first digital storage device and a second digital storage device, and the second digital storage device having a having a second data storage capacity and a second operation response time, where the second data storage capacity is greater than the first data storage capacity and the second operation response time is less than the first operation response time, where the storage controller is to assign logical block addresses to the first digital storage device and the second digital storage device, where an assigned last logical block address of the second data storage device is N, and a first assigned logical block address of the first data storage device is N+1.

Exemplary embodiments of the general inventive concept may also be achieved by providing a storage system including, among other things, a first storage unit having a first transfer rate to receive and store first data, a second storage unit having a second transfer rate slower than the first transfer rate to receive and store second data, and a controller to assign upper addresses to the first data and to assign lower address to the second data.

Exemplary embodiments of the general inventive concept may also be achieved by providing an electronic apparatus including, among other things, a processor to output data, and a storage system unit connected to the processor, and including a first storage unit having a first transfer rate to store data, a second storage unit having a second transfer rate slower than the first transfer rate to receive and store data, and a controller to assign upper addresses to the data to be stored in the first storage unit and to assign lower addresses to the data to be stored in the second storage unit.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 5 illustrates test results of data transmission speeds according to data storing locations of corresponding information in the storage apparatuses, when information is stored in a hybrid storage apparatus having a non-volatile memory apparatus and a hard disk drive apparatus in accordance with exemplary embodiments of the present general inventive concept;

DETAILED DESCRIPTION OF THE EMBODIMENTS

Figure 1:
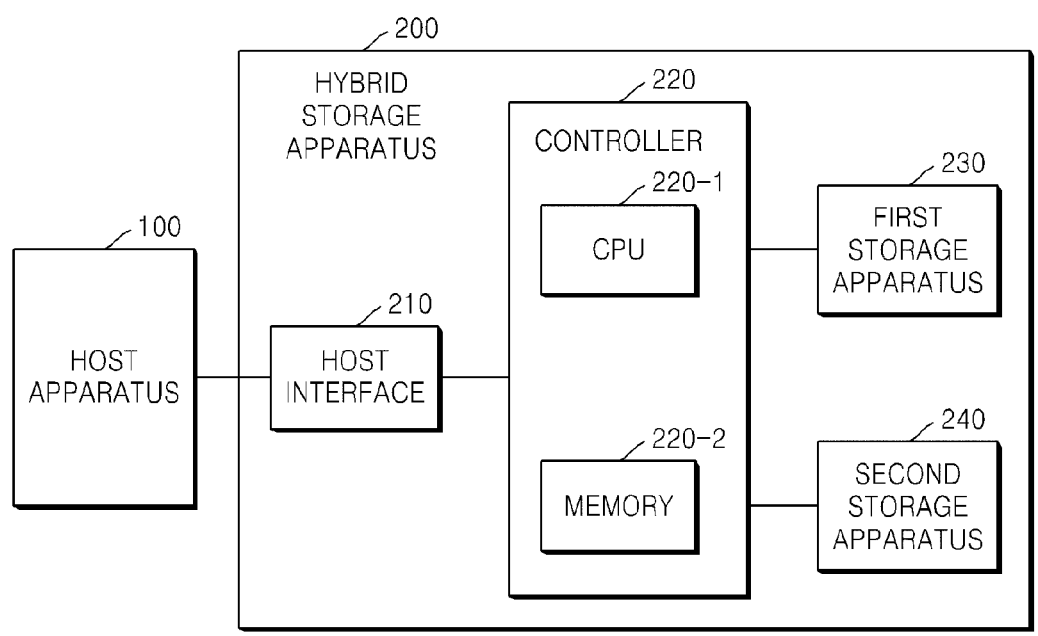
FIG. 1 illustrates a data storage system including a host apparatus and a hybrid storage apparatus in accordance with exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Referring to FIG. 1, an illustrated data storage system includes a host apparatus 100 and a hybrid storage apparatus 200 according to exemplary embodiments of the present general inventive concept.

The hybrid storage apparatus 200 includes a host interface 210, a controller 220, a first storage apparatus 230, and a second storage apparatus 240.

The controller 220 may be a RAID (Redundant Array of Independent Disks) controller or any other suitable controller to control a plurality of digital storage devices, such as hard disk drives, non-volatile semiconductor memory devices, optical storage devices, or any other suitable digital storage devices. The controller 220 includes a central processing unit (CPU) 220-1 and a memory 220-2. The CPU 220-1 may be a controller to control operations of the hybrid storage apparatus 200, for example, to control a process of analyzing a command, processing (operating/calculating) data, comparing the data, etc. The memory 220-2 stores programs, data, etc., to be used to control the hybrid storage apparatus 200, and/or stores programs, data, etc., to be used to perform operations of a method illustrated in FIG. 7.

The first storage apparatus 230 and the second storage apparatus 240 may be a non-volatile storage apparatus to be able to store programs, data, etc., even when power is turned off or power is otherwise unavailable. The first storage apparatus 230 and the second storage apparatus 240 may have different storing methods, for example, writing and/or reading methods. A hard disk drive apparatus may be used as the first storage apparatus 230, and a non-volatile memory may be used as the second storage apparatus 240 according to exemplary embodiments of the present general inventive concept. For the purpose of the description of the various exemplary embodiments, a plurality of storage apparatuses are included in the hybrid storage apparatus 200. However, the present general inventive concept is not limited thereto. More than three storage apparatuses can be included in the hybrid storage apparatus 200.

The second storage apparatus 240 may be implemented a non-volatile memory, a flash memory, phase change random access memory (Phase Change RAM), Ferroelectric random access memory (Ferroelectric RAM), magnetic random access memory (Magnetic RAM), etc.

The host interface 210 may perform data transmission and reception with the host apparatus 100 according a designated communication method, for example, an integrated drive electronics (IDE) interface standard, or any other suitable data communication standard. According to exemplary embodiments of the present general inventive concept, the host interface 210 performs the data transmitting and receiving of the plurality of storage apparatuses of the hybrid storage apparatus 200 with the host apparatus 100.

The CPU 220-1 of the controller 220 may control the first storage apparatus 230 and the second storage apparatus 140 of the hybrid storage apparatus 200 as a single or unit storage apparatus. The CPU 220-1 of the controller 220 may assign logical block address (LBA), and controls an accessing operation to access the first storage apparatus 230 and the second storage apparatus 240 according to the assigned LBA. The CPU 220-1 of the controller 220 may communicate with the host apparatus 100 regarding the first storage apparatus 230 and the second storage apparatus 240 as a single or unit storage apparatus.

When the first storage apparatus 230 and the second storage apparatus 240 are connected or combined as a single storage apparatus, a method of assigning LBA to the first storage apparatus 230 and the second storage apparatus 240 as the single storage apparatus will be described hereinafter.

Figure 13A:
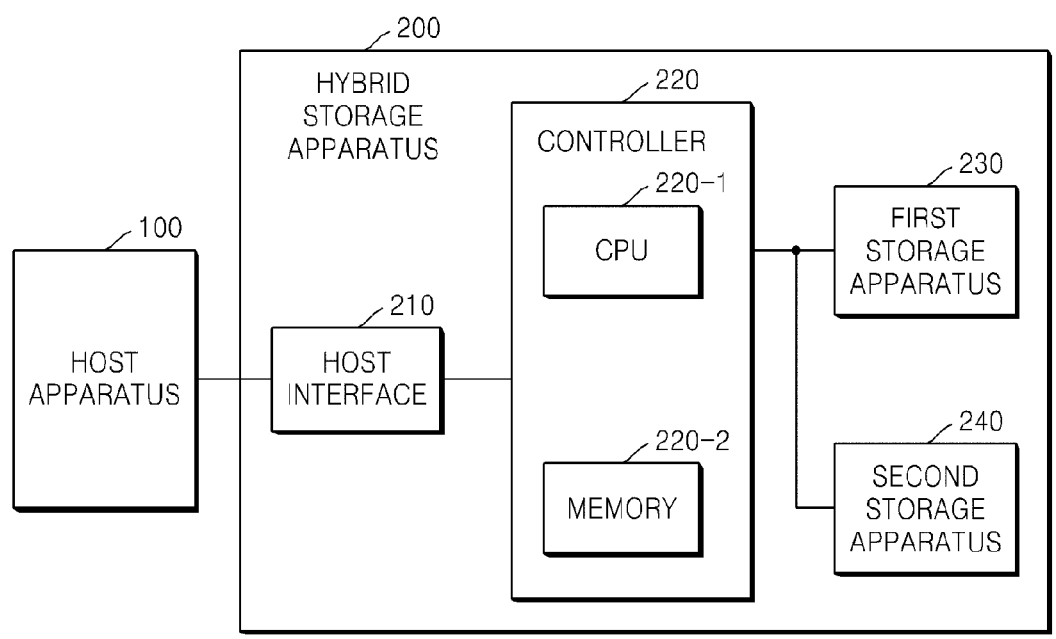
FIGS. 13A-13D illustrate different data storage system arrangements of FIG. 1 according to exemplary embodiments of the present general inventive concept.
Figure 13B:
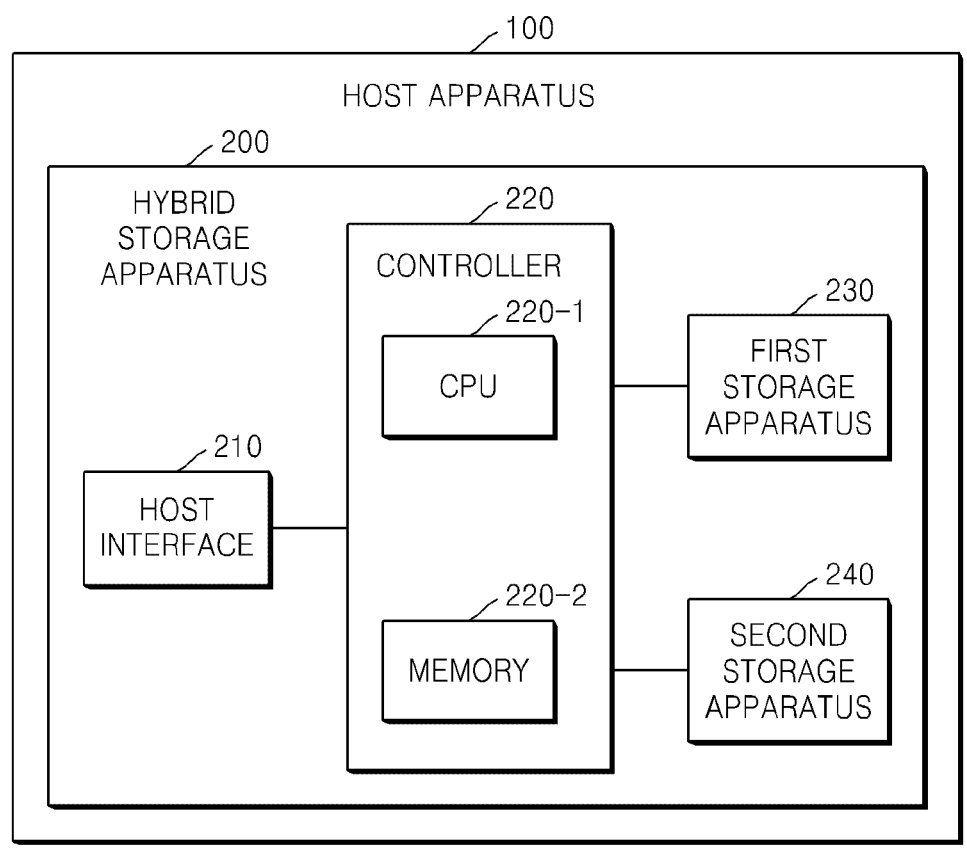

Turning to FIGS. 13A-13D, these figures illustrate different configurations of the host apparatus 100, the hybrid storage apparatus 200, the host interface 210, the controller 220, the first storage apparatus 230, and the second storage apparatus 240 according to various embodiments of the present general inventive concept. As illustrated in FIG. 13A, the first storage apparatus 230 and the second storage apparatus 240 may be communicatively coupled to the controller 220 using the same communication interface or same data line, rather than being separately coupled as illustrated in FIG. 1. Turing to FIG. 13B, the host apparatus 100 may include the hybrid storage apparatus 200, the host interface 210, the controller 220, the first storage apparatus 230, and the second storage apparatus 240, rather than having the host apparatus 100 separately coupled to the hybrid storage apparatus 200 via the host interface 210. In the arrangement illustrated in FIG. 13B, although the hybrid storage device is included in the host apparatus 100, the host apparatus 100 and the hybrid storage apparatus 200 may alternatively communicate with one another via the host interface 210.

Figure 13C:
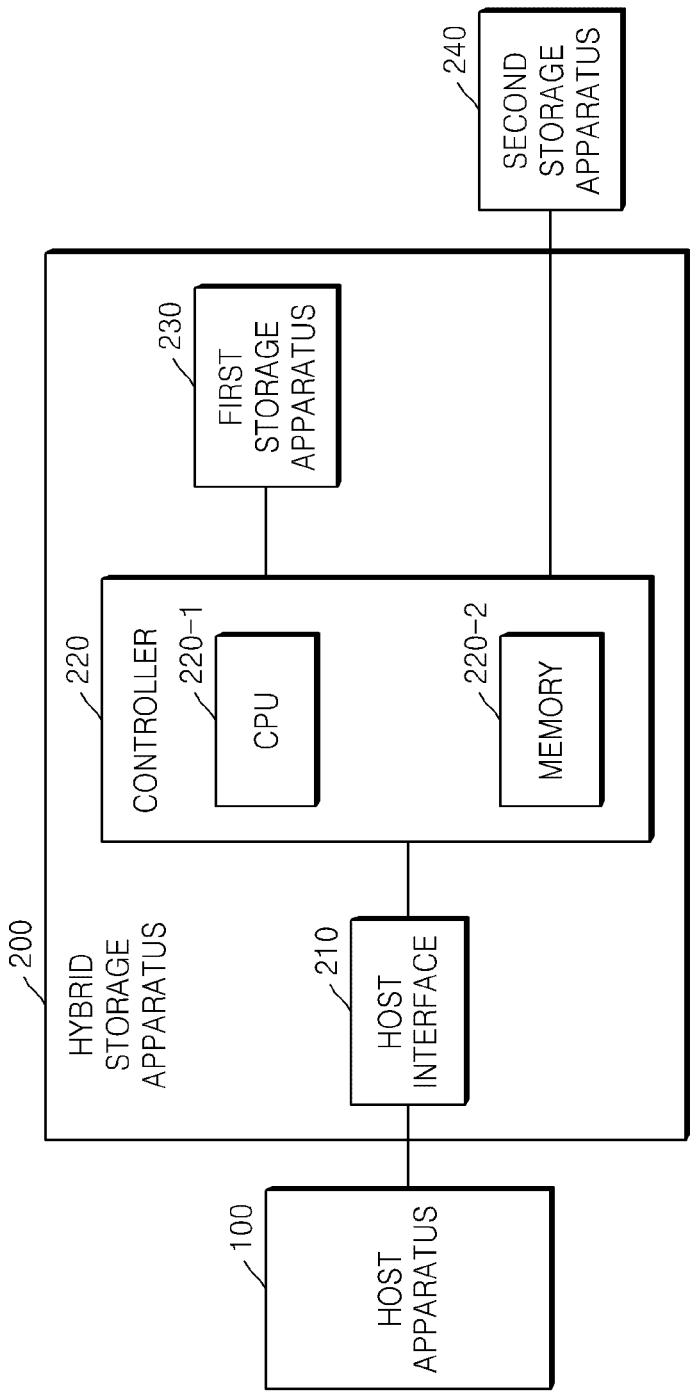
Figure 13D:
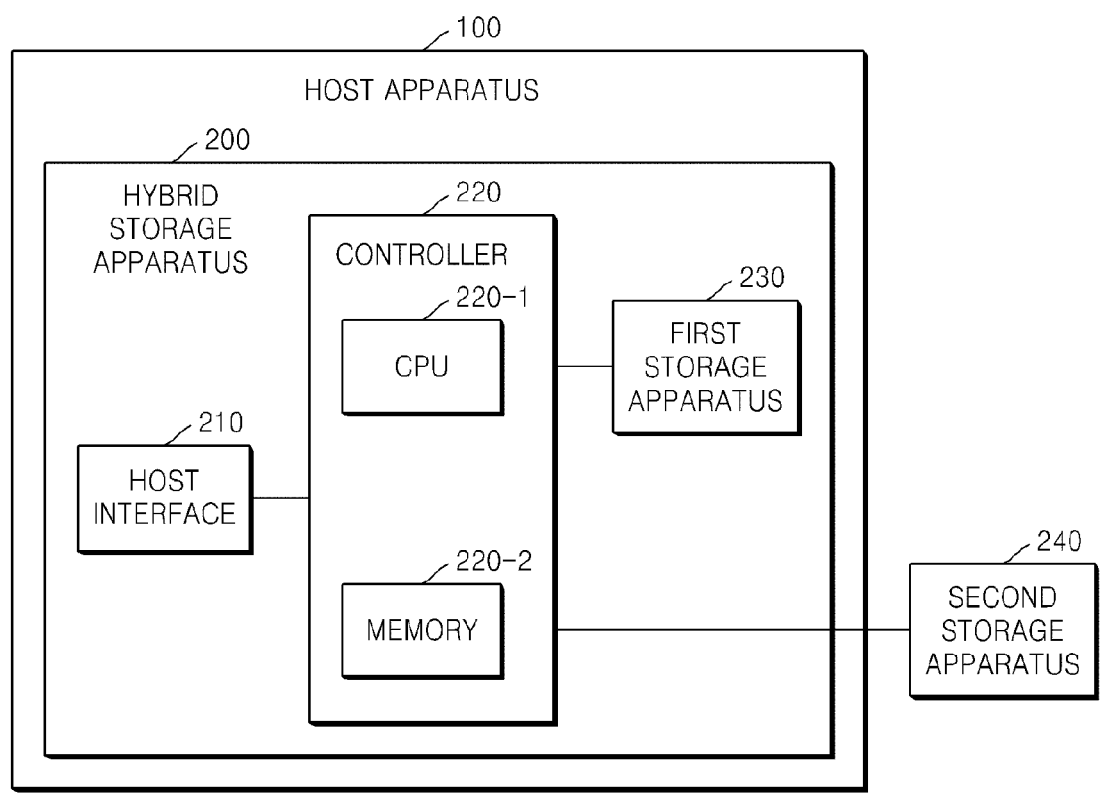

FIG. 13C illustrates a configuration of the host apparatus 100, the hybrid storage apparatus 200, the host interface 210, the controller 220, the first storage apparatus 230, and the second storage apparatus 240 where the second storage apparatus 240 is external to the hybrid storage apparatus 200, but controlled by the controller 220 included in the hybrid storage apparatus 200. Alternatively, the first storage apparatus 230 may be located outside the hybrid storage apparatus 200, and the second storage apparatus may be included in the hybrid storage apparatus 200. FIG. 13D illustrates a configuration where the host apparatus 100 includes the hybrid storage apparatus 200, and the first storage apparatus 230 is included in the hybrid storage apparatus 200 and the second storage apparatus 240 is located outside of the host apparatus 100 and communicatively coupled to the controller 220 of the hybrid storage apparatus 200. Alternatively, the second storage apparatus 240 may be located outside the hybrid storage apparatus but within the host apparatus 100 and communicatively coupled to the controller 220.

The illustrated configurations in FIGS. 13A-13D are exemplary embodiments of the host apparatus 100, the hybrid storage apparatus 200, the host interface 210, the controller 220, the first storage apparatus 230, and the second storage apparatus 240, and other suitable configurations of the host apparatus 100, the hybrid storage apparatus 200, the host interface 210, the controller 220, the first storage apparatus 230, and the second storage apparatus 240 may be used to achieve the present general inventive concepts described throughout.

The host apparatus 100 illustrates in FIGS. 1, 10, 11, and 13A-13D may operate according to an operating system (OS) program of a Microsoft Windows® system, or any other suitable operating system. The operating system can be stored at upper LBA of the storage apparatus connected to the host apparatus 100.

Figure 4:
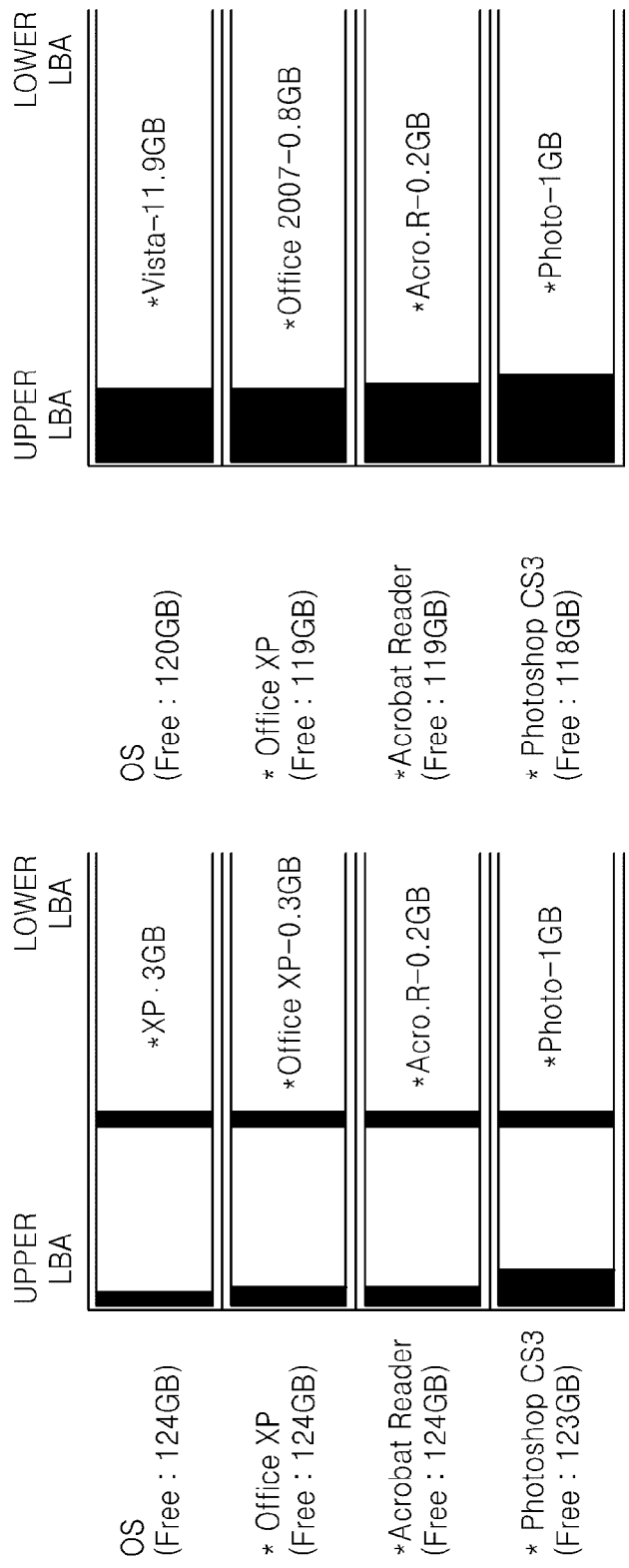
FIG. 4 illustrates a state of storing areas of a hard disk drive to store an operating system when a host apparatus of the data storage system uses a single hard disk drive as a computer storage apparatus in accordance with exemplary embodiments of the present general inventive concept.

Referring to FIG. 4, a state of storing areas of a hard disk drive to store an operating system when a host apparatus of the data storage system uses a single hard disk drive as a computer storage apparatus in accordance with exemplary embodiments of the present general inventive concept are illustrated. In FIG. 4, a state of storing areas of a hard disk drive to store OS, Microsoft Office XP®, Adobe Acrobat® and Photoshop® CS3 programs in case of Windows XP® and Windows Vista®, when the host apparatus 100 uses a single hard disk drive as a computer storage apparatus are illustrated.

Referring to FIG. 4, the OS program and the main application programs can be stored at upper LBA area of the hard disk drive.

FIG. 5 illustrates test results of data transmission speeds according to data storing locations of corresponding information in the storage apparatuses, when the OS program, application program, and data file are stored in a hybrid storage apparatus having a non-volatile memory apparatus and a hard disk drive apparatus.

Referring to FIG. 5, in cases of case #1 and case #2 where the OS program and application program are stored in the NV memory, the data transmission speed of the NV memory is faster than other cases. It is possible that the data transmission speed is not affected by the storage apparatus storing the data file.

Referring to FIGS. 4 and 5, when the upper LBA is assigned to a storage apparatus having a higher speed and a higher transmission rate than other storage apparatus, the hybrid storage apparatus can increase efficiency and efficacy in transmitting data and information.

According to exemplary embodiments of the present general inventive concept, a hybrid storage apparatus may control the plurality of storage apparatuses as a single storage apparatus to assign upper LBAs to storage apparatuses having a high data transmission rate in order according to the data transmission rate.

Figure 6:
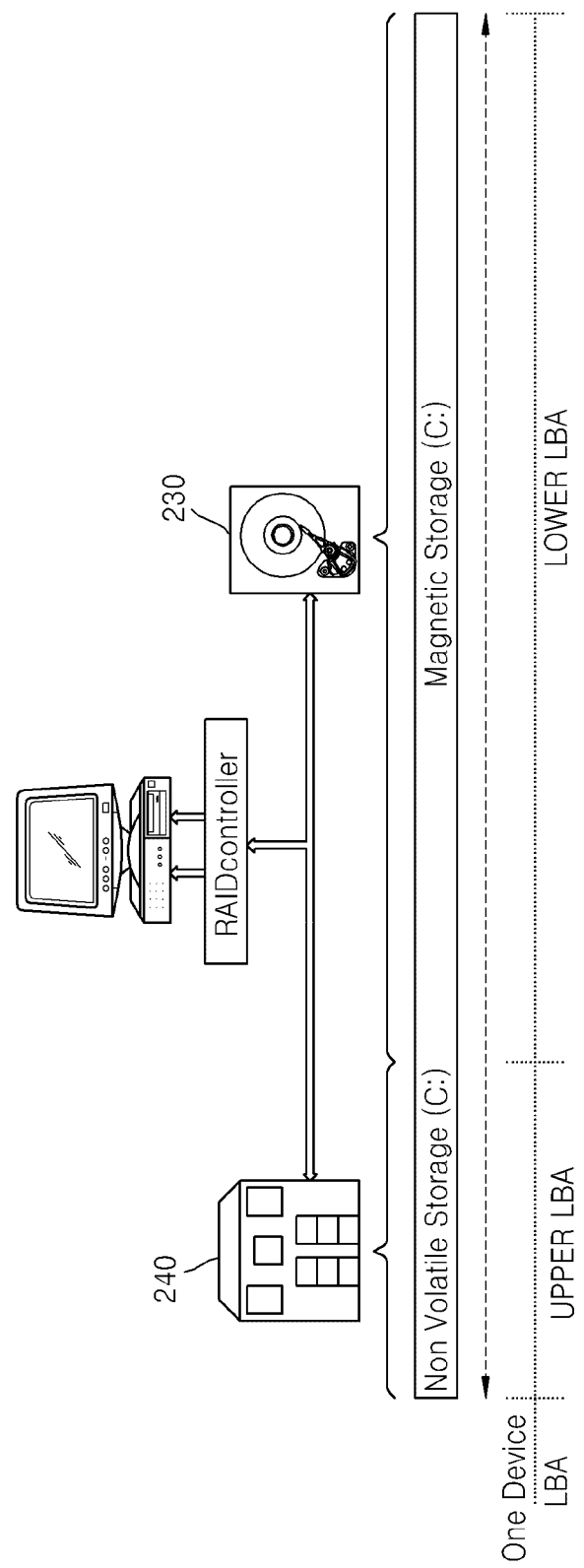
FIG. 6 illustrates the assignment of Logical Block Addresses (LBAs) for a hard disk drive as the first storage apparatus of the hybrid storage apparatus and a non-volatile memory as the second storage apparatus of another hybrid storage apparatus in accordance with exemplary embodiments of the present general inventive concept.

That is, when a hard disk drive is used as the first storage apparatus 230 of the hybrid storage apparatus 200 and a non-volatile memory is used as the second storage apparatus 240 of the hybrid storage apparatus 200, LBAs can be assigned as illustrated in FIG. 6.

Referring to FIG. 6, the upper LBA is assigned to the second storage apparatus 240 having a high data transmission rate than the first storage apparatus 230, and the lower LBA which is lower than and next to a last LBA of the upper LBA assigned to the second storage apparatus 240 is assigned to the first storage apparatus 230.

Referring back to FIG. 1, the CPU 220-1 of the controller 220 reads data transmission rate information of the first storage apparatus 230 and the second storage apparatus 240, assigns the upper LBA to a storage apparatus having a relatively higher data transmission rate, assigns the lower LBA to a storage apparatus having a relatively lower data transmission rate, stores in the memory 220-2 information on the assignment of the upper and lower LBAs assigned to the corresponding storage apparatuses, and communicates with the host apparatus 100 to transmit (report) the information as the single (unit) storage apparatus to the host apparatus 100. For example, the controller 220 may determine that the second storage apparatus 240 has a higher data transmission rate than the first storage apparatus 230, and assigns the upper LBA to the second storage apparatus 240 and the lower LBA to the first storage apparatus 230. In this example, the controller 220 may store in memory 220-2 the information that the upper LBA is assigned to the second storage apparatus 240 and the lower LBA is assigned to the first storage apparatus 230.

The CPU 220-1 of the controller 220 performs an operation of copying information including master boot record (MBR) information and system file information stored in the system file area of the second storage apparatus 240 assigned to the upper LBA, and an operation of storing the information in the second storage apparatus 230 at the lower LBA.

Accordingly, the host apparatus 100 may recognize the first storage apparatus 230 and the second storage apparatus 240 included in the hybrid storage apparatus 200 as a single storage apparatus. That is, the host apparatus 100 can communicate with the hybrid storage apparatus 200 through a single host interface 210 to transmit and receive data with the first storage apparatus 230 and the second storage apparatus 240 through the single host interface 210, thereby improving the random access speed to access the first storage apparatus 230 (e.g., where the first storage apparatus 230 has a relatively lower data transmission rate compared to the second storage apparatus 240).

Figure 2:
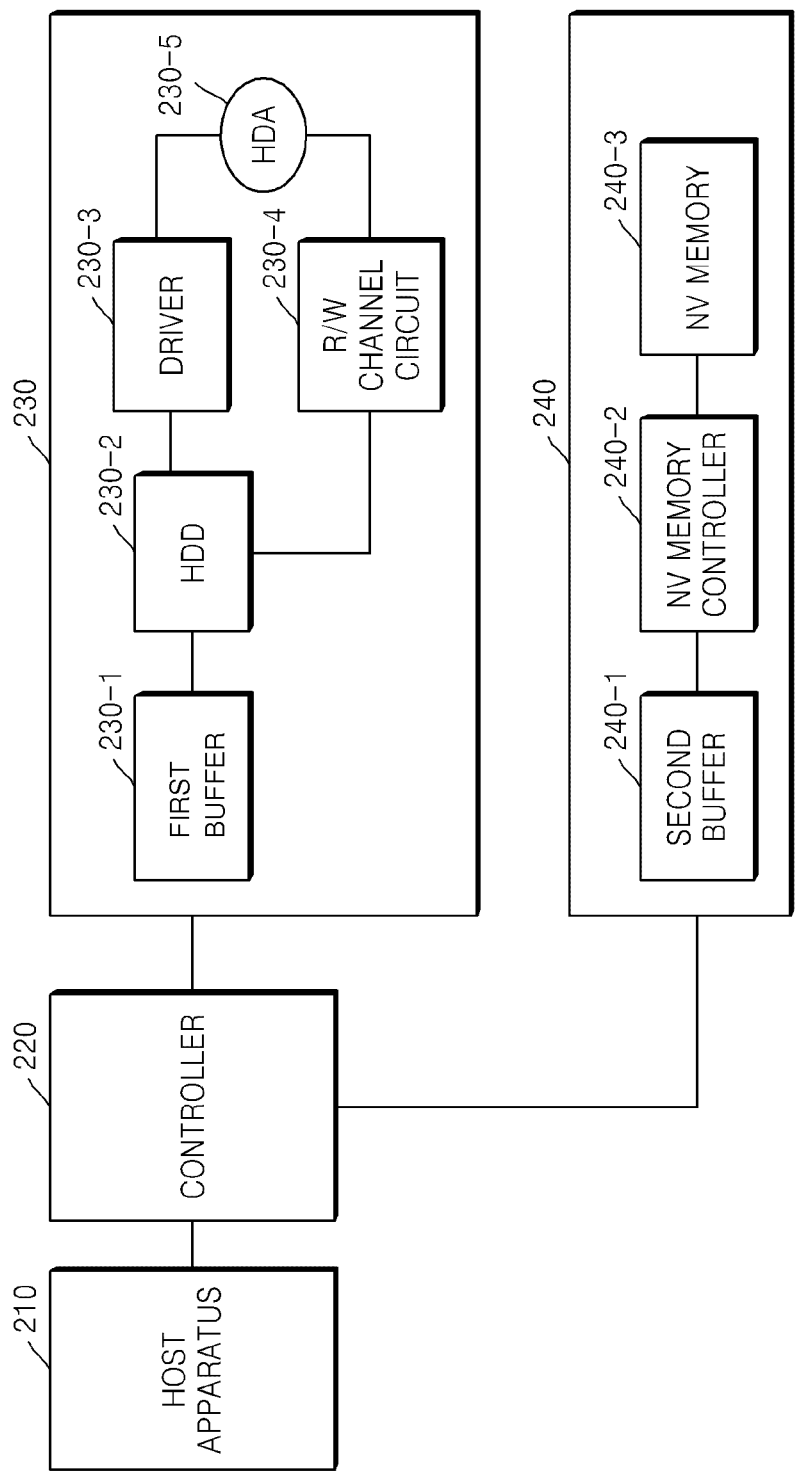
FIG. 2 illustrates a block diagram of a first storage apparatus implemented as a hard disk drive and a second storage apparatus implemented non-volatile (NV) memory in the data storage system of FIG. 1 in accordance with exemplary embodiments of the present general inventive concept.

FIG. 2 illustrates a detailed block diagram of the first storage apparatus 230 and the second storage apparatus 240 implemented as the hard disk drive and the NV memory, respectively, in the data storage system of FIG. 1, or, alternatively, in the data storage systems illustrated in FIGS. 13A-13D. Here, a non-volatile semiconductor memory apparatus is referred to as the non-volatile memory apparatus or the NV memory apparatus.

As illustrated in FIG. 2, the first storage apparatus 230 may include a first buffer 230-1, an HDD controller 230-2, a driver 230-3, a read/write (R/W) channel circuit 230-4, and a head disk assembly (HAD) 230-5, and the second storage apparatus 240 may include a second buffer 240-1, an NV memory controller 240-2, and an NV memory 240-3.

Figure 7:
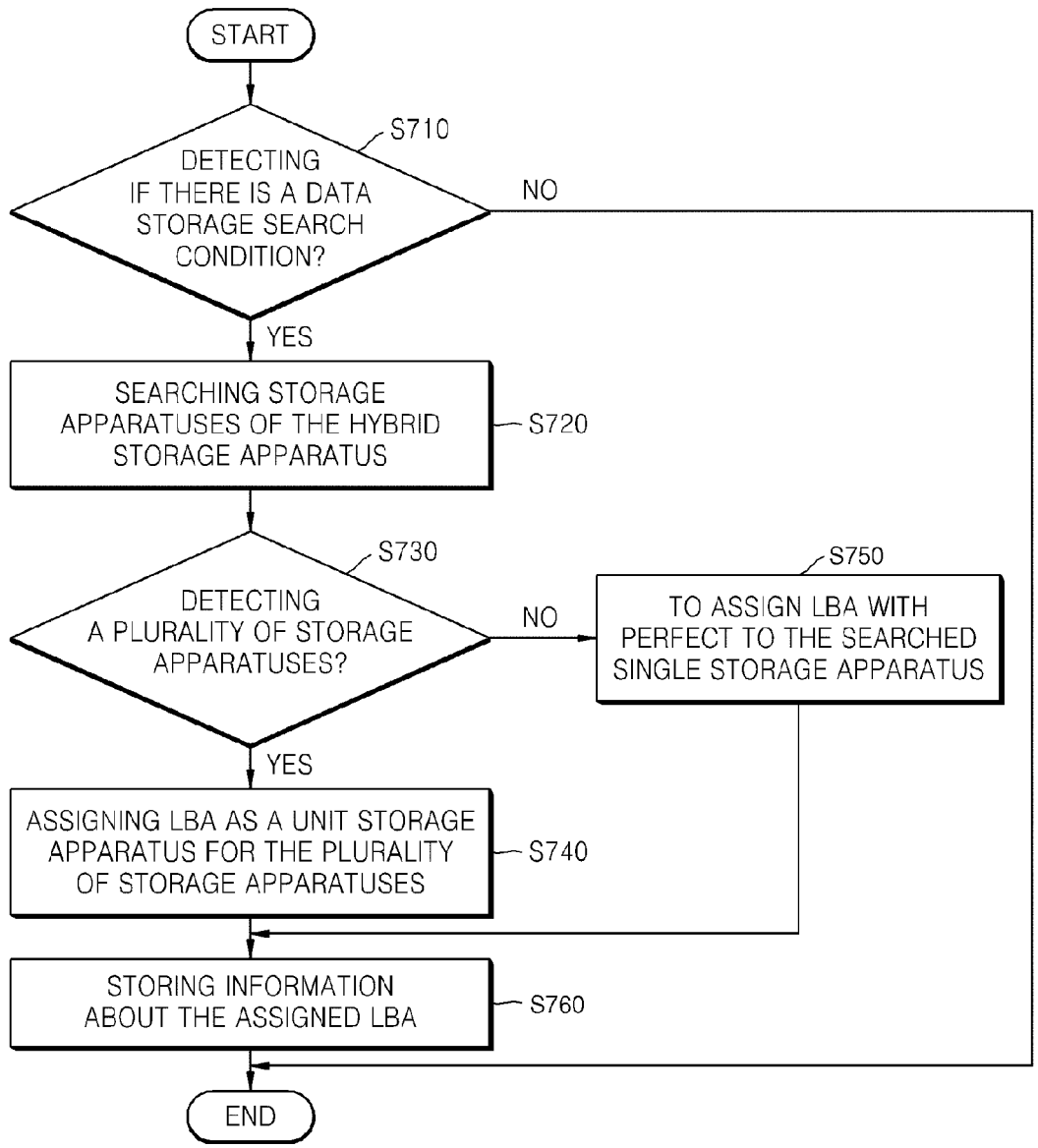
FIG. 7 illustrates a Logical Block Address assigning method of a hybrid storage device in accordance with exemplary embodiments of the present general inventive concept.

The controller 220 may assign LBAs to the hybrid storage apparatus as illustrated in FIG. 7.

Referring to FIG. 7, a Logical Block Address assigning method of a hybrid storage device in accordance with exemplary embodiments of the present general inventive concept is illustrated. The controller 220, as illustrated and described in connection with FIGS. 1, 2, and 13A-13D, determines whether a storage apparatus search condition is generated at operation S710. For example, the storage apparatus search condition may be when the hybrid storage apparatus is changed from a power off state to a power on state, or is in a state of reset.

When the storage apparatus search condition is generated or detected at operation S710, the controller 220 searches one or more storage apparatuses included in the hybrid storage apparatus 200 at operation S720.

It is determined whether a plurality of storage apparatuses has been searched or detected at operation S730.

When a plurality of storage apparatuses has been searched or detected at operation S730, the controller 220 controls the plurality of storage apparatuses as a single (or unit) storage apparatus or as a combined storage apparatus to assign LBAs at operation S740. One or more higher LBAs may be assigned to corresponding ones of one or more storage apparatus having higher data transmission rates in order.

That is, the controller 220 reads a data transmission rate of a hard disk drive stored in a hard disk or an internal memory, and a data transmission rate of the NV memory apparatus stored in an NV memory 240-3 or an internal memory of the NV memory apparatus 240, and assigns the upper LBAs to the corresponding storage apparatuses according to the relative data transmission speeds.

Figure 8:
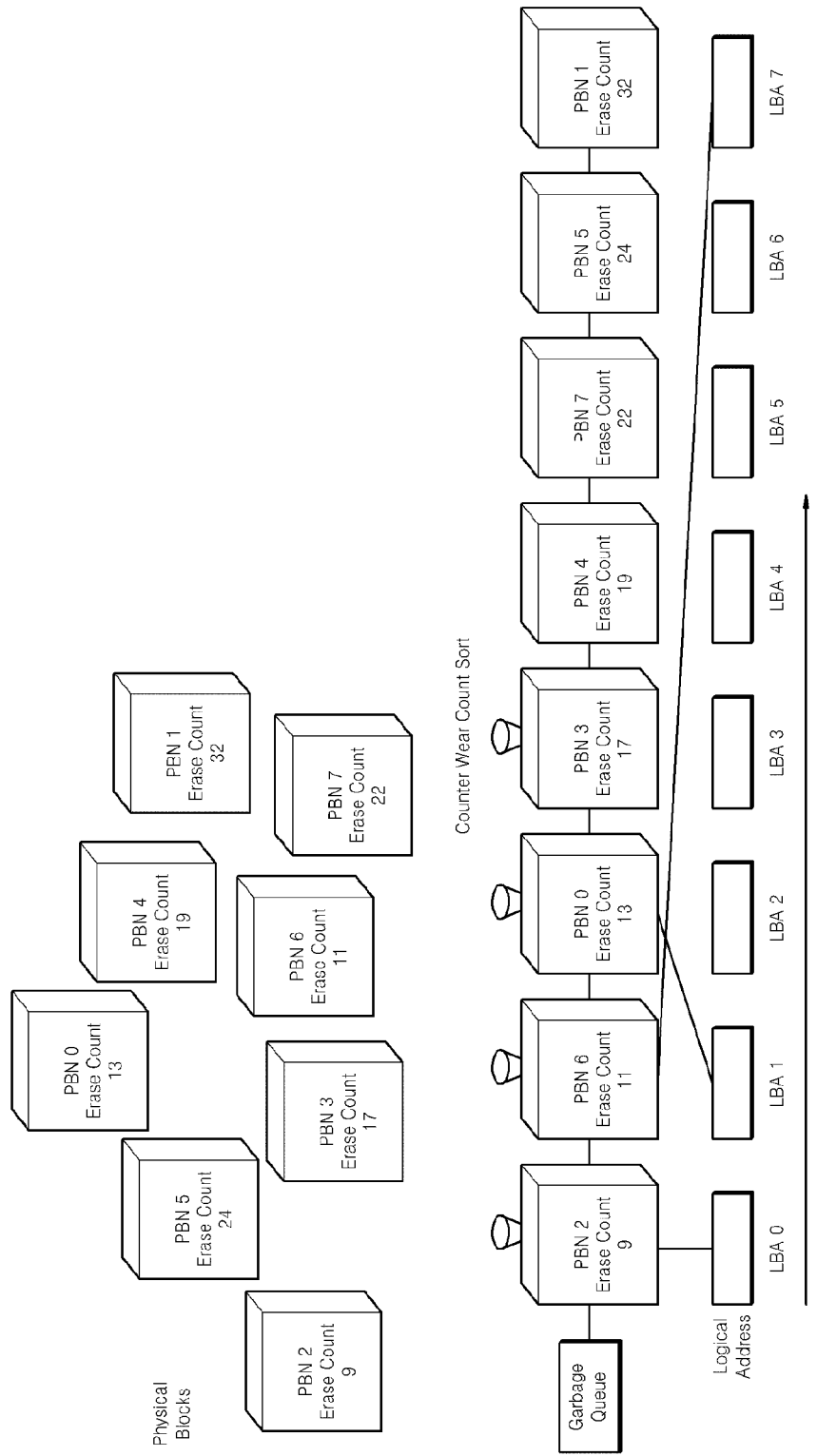
FIG. 8 illustrates a Logical Block Address assigning method of a NV memory apparatus in accordance with exemplary embodiments of the present general inventive concept.

FIG. 6 illustrates the assignment of Logical Block Addresses (LBAs) for a hard disk drive as the first storage apparatus of the hybrid storage apparatus and a non-volatile memory as the second storage apparatus of another hybrid storage apparatus in accordance with exemplary embodiments of the present general inventive concept. As illustrated in FIG. 6, the controller 220 maps the NV memory apparatus with the one or more upper LBAs. As illustrated in FIG. 8, physical memory block numbers (PBN) of the NV memory apparatus 220 may be classified with a wear count, such that the physical memory blocks are mapped with virtual LBAs.

Figure 9:
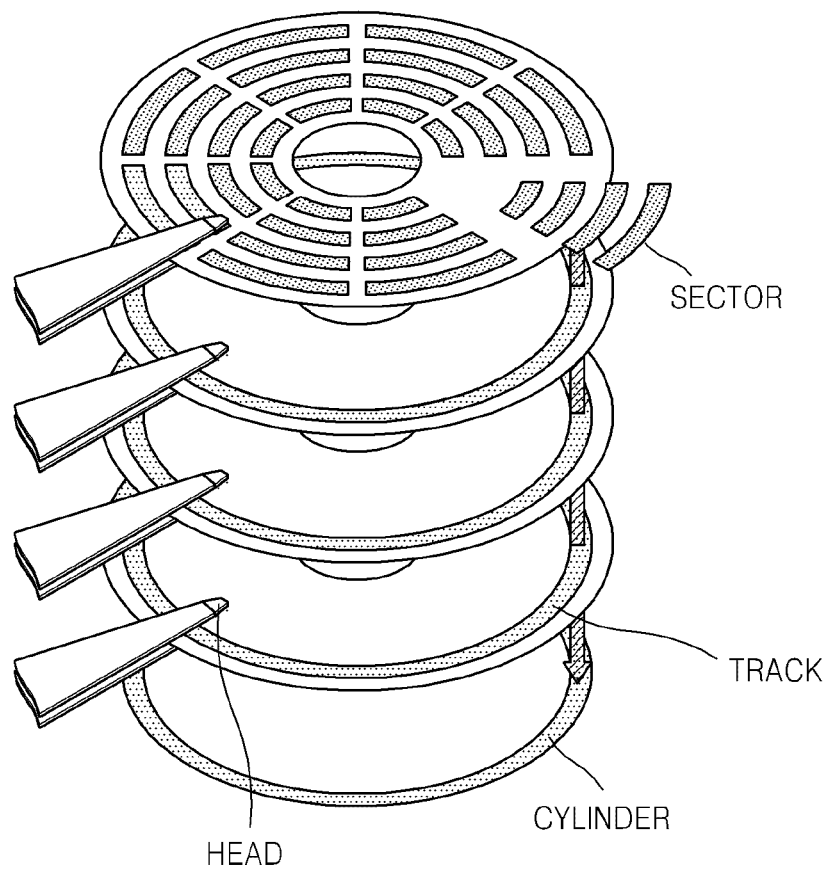
FIG. 9 illustrates a Logical Block Address assigning method of a hard disk drive apparatus in accordance with exemplary embodiments of the present general inventive concept.

After the controller 220 maps the NV memory apparatus 240 using the upper LBAs, the controller 220 maps the hard disk drive 230 using lower LBAs following a last one of the upper LBAs assigned to the NV memory apparatus 240. That is, as illustrated in FIG. 9, CHS (cylinder-head-sector) values of a three dimensional address assigning method may be ignored, and the writing area of the hard disk can be mapped using the virtual LBAs which correspond to the two dimension sectors of the hard disk.

The controller 220 assigns the NV memory apparatus 240 and the hard disk drive 230 with LBAs as the NV memory apparatus 240 and the hard disk drive 230 are combined or united into a virtual single storage apparatus as illustrated in FIG. 6.

The controller 220 controls the NV memory apparatus 240 and the hard disk drive 230 such that system files including MBR information stored in the system file area of the NV memory apparatus 240 is copied and the copied system files are stored in an area designated in the hard disk drive 230.

Figure 12:
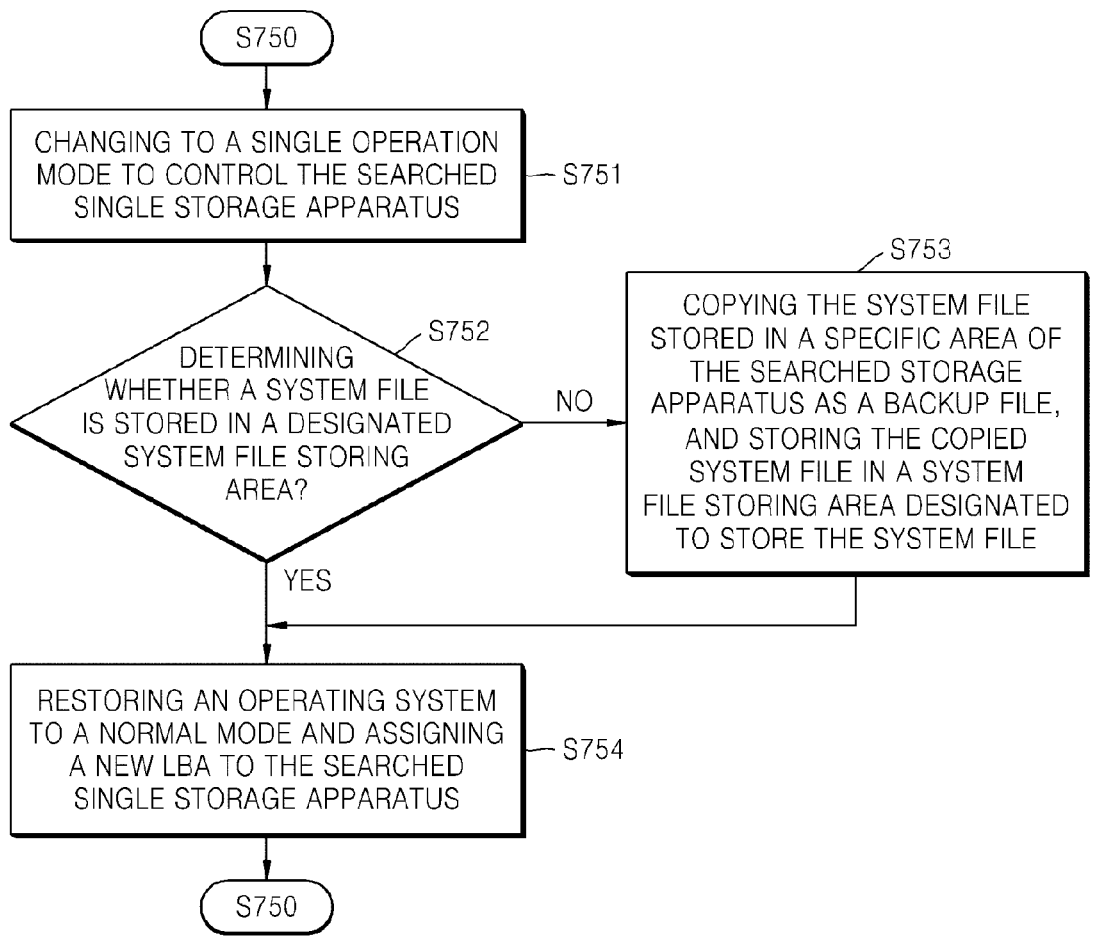
FIG. 12 illustrates a flowchart of operation of S750 of FIG. 7 of assigning LBA with respect to a searched single storage apparatus in accordance with exemplary embodiments of the present general inventive concept.

When there is one storage apparatus at operation S730, the controller is changed into a single operation mode to assign LBAs to the searched one storage apparatus at operation S750. FIG. 12 illustrates operation S750 of FIG. 7 in further detail, as described below.

The controller 220 is changed to a single operation mode to operate or control the searched one storage apparatus at operation S751 of FIG. 12.

The controller 220 determines whether system files including MBR information are stored in an area designated to store the system files of the searched one storage apparatus at operation S752.

When the system files including MBR information are not stored in an area designated to store the system files of the searched one storage apparatus at operation S752, the system files stored in a predetermined area of the searched one storage apparatus as a backup is copied and the copied system files are stored in a designated area at operation S753. Therefore, the operating system can be restored to operate in a normal mode in the searched one storage apparatus.

When the system files including MBR information are stored in an area designated to store the system files of the searched one storage apparatus at operation S752, operation S753 is performed to restore the operation system in a normal mode to assign new LBAs to the searched one storage apparatus.

Accordingly, when one of the plurality of storage apparatuses of the hybrid storage apparatus 200 is searched or detected as a normally operating storage apparatus, LBAs can be assigned to the corresponding normally operating storage apparatus such that the hybrid storage apparatus can perform an normal operation as a storage apparatus.

Here, the other one of the plurality of storage apparatuses may not be detected as a normally operating storage apparatus or may not be detected at all due to other reasons, for example, a malfunction or a power interruption supplied to the corresponding storage apparatus.

When operation S740 or S750 of FIG. 7 are performed, the controller 220 stores information on the assigned LBAs in an area of the memory 220-1 of the controller or a storage area corresponding to initially set LBAs at operation S760 of FIG. 7.

The controller 220 reports to the host apparatus 100 about the information as a single storage apparatus through a single host interface 210.

As described above, when any one of the one or more searched storage apparatuses is not assigned with LBAs as a single (unit) storage apparatus, the controller 220 or when the storage apparatus assigned with the LBAs is not searched or detected, a new LBA can be assigned to the corresponding one of the storage apparatuses.

Figure 3:
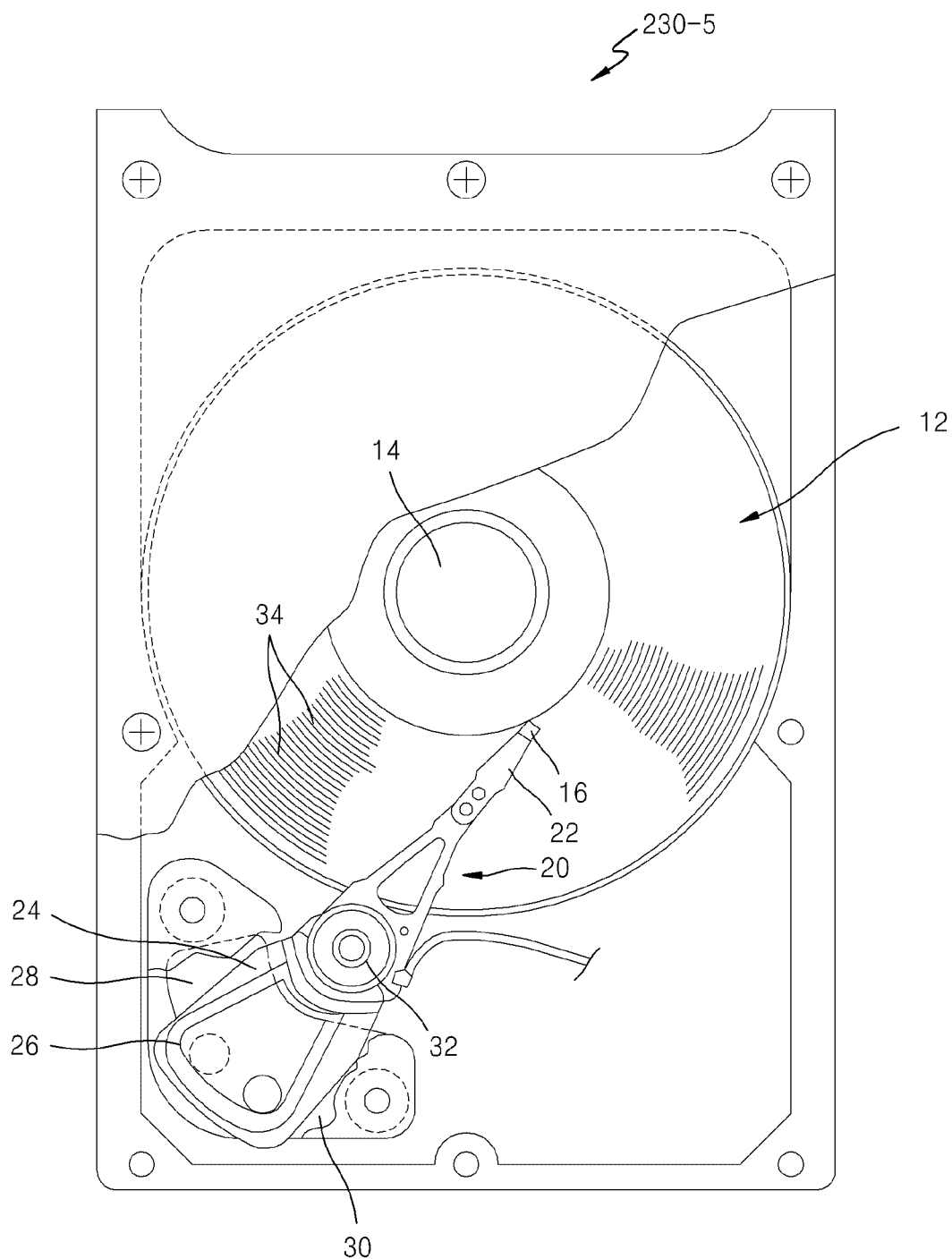
FIG. 3 illustrates a hard disk apparatus of the first storage apparatus illustrated in FIG. 2 in accordance with exemplary embodiments of the present general inventive concept.

FIG. 3 illustrates a hard disk apparatus of the first storage apparatus illustrated in FIG. 2 in accordance with exemplary embodiments of the present general inventive concept. In particular, FIG. 3 illustrates a detailed structure of the head disk assembly (HDA) 230-5 of FIG. 2.

The HDA 230-5 includes at least one disk or magnetic disk 12 rotating by a spindle motor 14. The HDA 230-5 includes a converter (head) 16 disposed adjacent to a surface of the disk 12.

The converter 16 detects a magnetic field of the corresponding disk 12 and magnetizes the disk 12 to read and write information from and on the disk 12. The converters 16 are disposed to correspond to respective surfaces of the disks 12. Although a single converter is illustrated in FIG. 3, the converter may include a write converter to magnetize the disk 12 and a read converter to read a magnetic field of the disk 12. The write converter and the read converter may be separated. A magneto-resistive element can be used as the read converter. The converter 16 is referred to as a head.

The converter 16 may be installed on a slider 20. The slider 20 has a structure to generate or create an air bearing between surfaces of the converter 16 and the disk 12. The slider 20 may be combined with a head gimbal assembly 22. The head gimbal assembly 22 is attached to an actuator arm 24 with a voice coil 26. The voice coil 26 is disposed adjacent to a magnetic assembly 28 to correspond to a voice coil motor (VCM) 30. Current is supplied to the voice coil 26 to generate a torque to rotate the actuator arm 24 with respect to the bearing assembly 32. The rotation of the actuator arm 24 moves the converter 16 with respect to the surface of the disk 12 to cross tracks 34. Information may be stored in the tracks of the disk 12 formed in a circular direction. Each track 34 includes a plurality of sectors. Each sector includes at least one data field and/or at least one identification field. The identification field includes a gray code to recognize the sector and track (cylinder). According to a flowchart of a method illustrated in FIG. 7, a LBA is assigned to an area of the disk 12 in which a writing operation can be performed. In the hard disk drive, LBAs can be converted into cylinder/head/sector (CHS) information to designate a write area of the disk 12. The converter 16 traverses the surface of the disk 12 to read the information from different tracks or to write information on different tracks.

Referring to FIGS. 2 and 3, a data read and write operation of the hybrid storage apparatus is described hereinafter. In particular, a data read operation 3000 is illustrated in FIGS. 15A-15C, and a data write operation 3100 is illustrated in FIGS. 16A-16C.

Figure 15A:
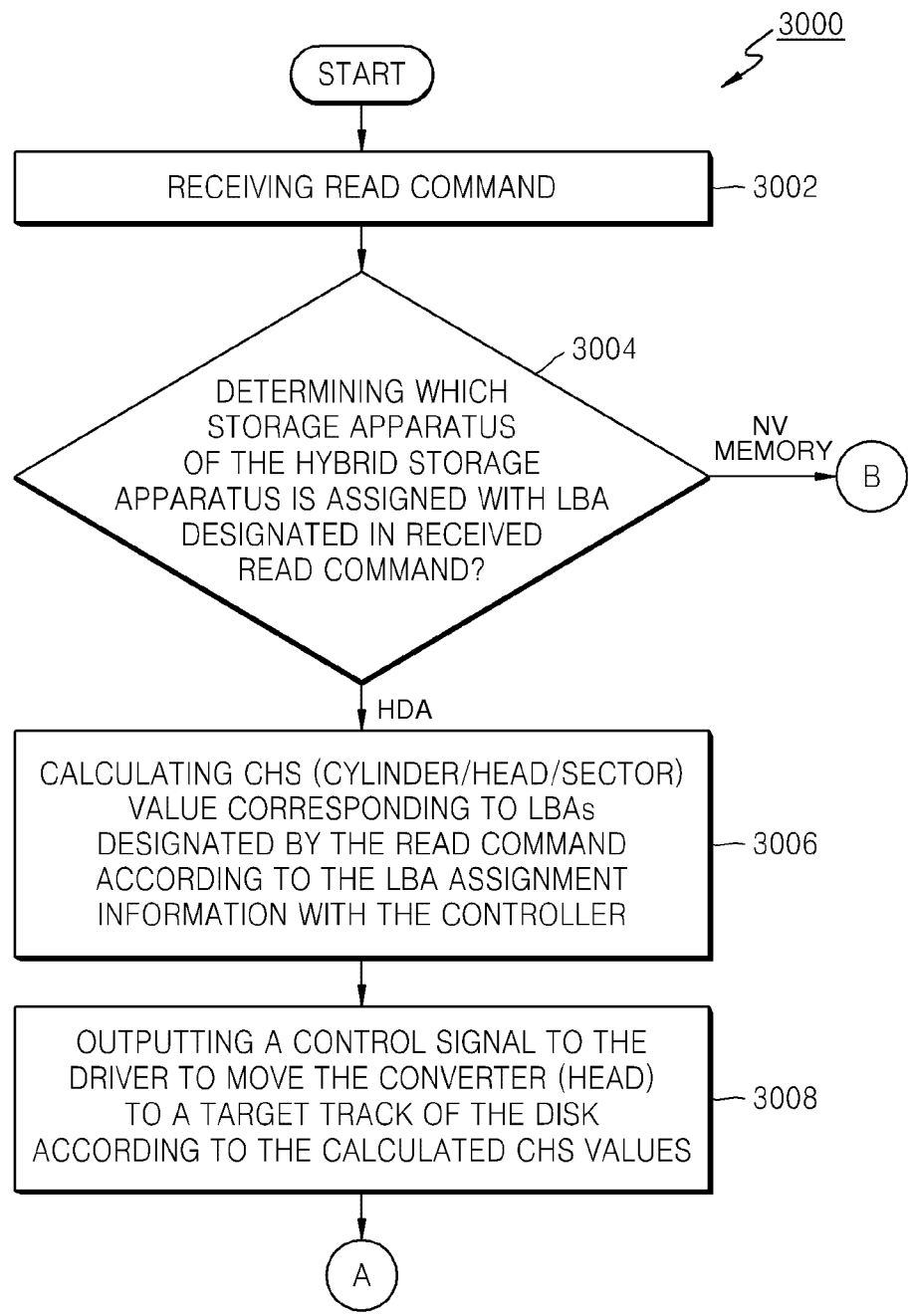
FIGS. 15A-15C illustrate read operation addressing in a hybrid storage apparatus according to exemplary embodiments of the present general inventive concept.
Figure 15B:
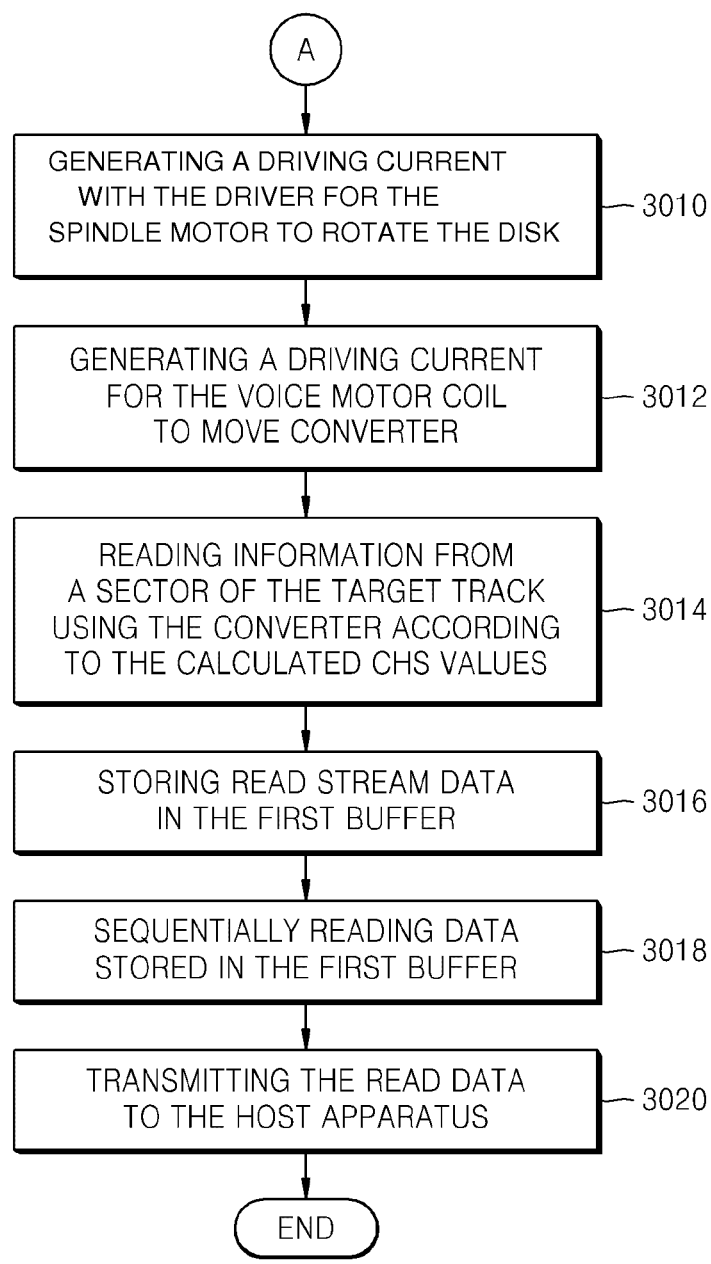
Figure 15C:
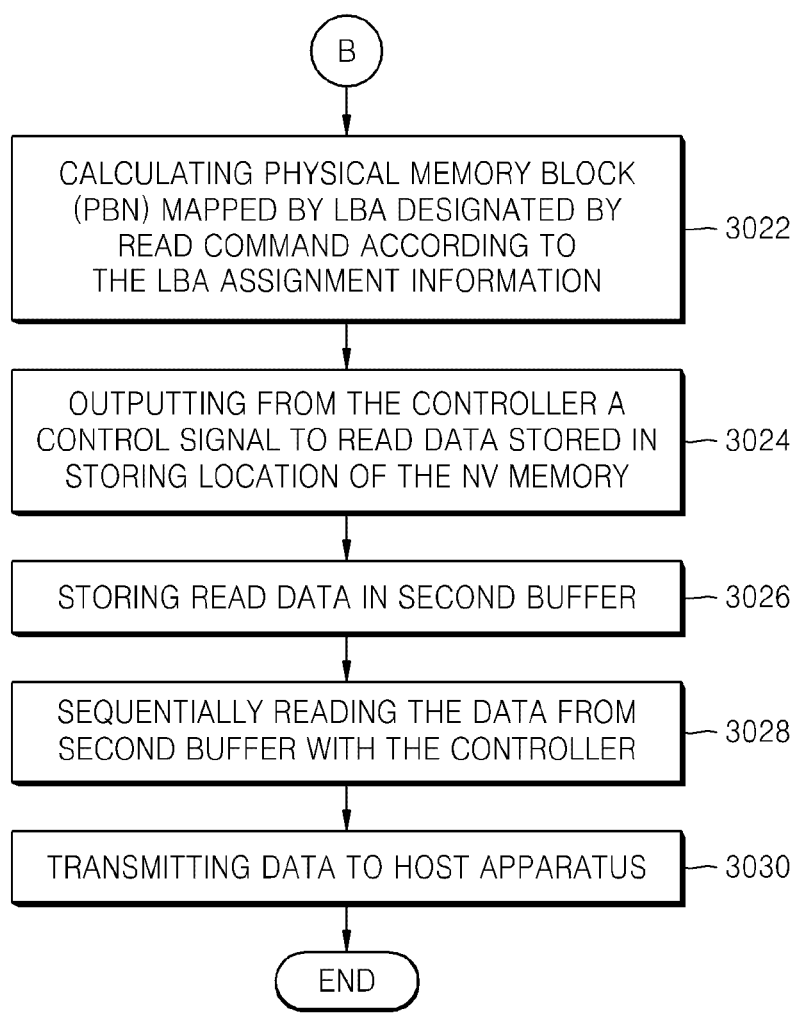
Figure 16A:
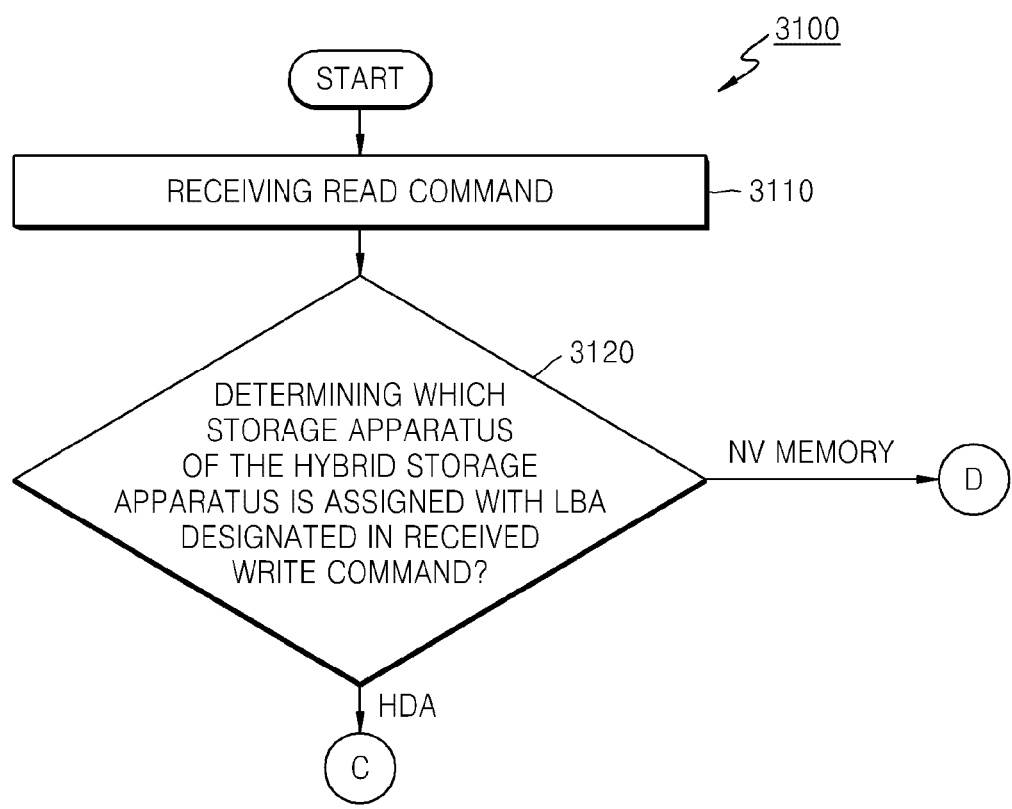
FIGS. 16A-16C illustrate write operation addressing in a hybrid storage apparatus according to exemplary embodiments of the present general inventive concept.
Figure 16B:
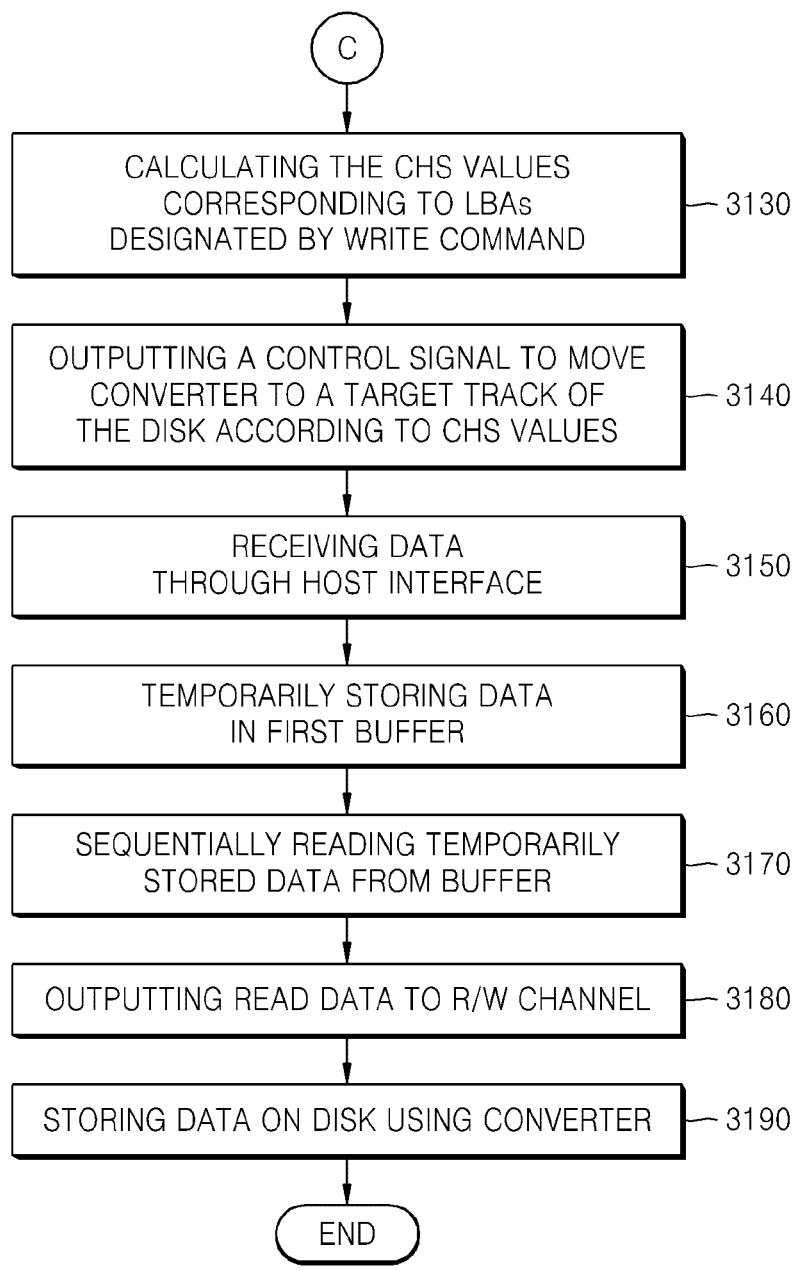
Figure 16C:
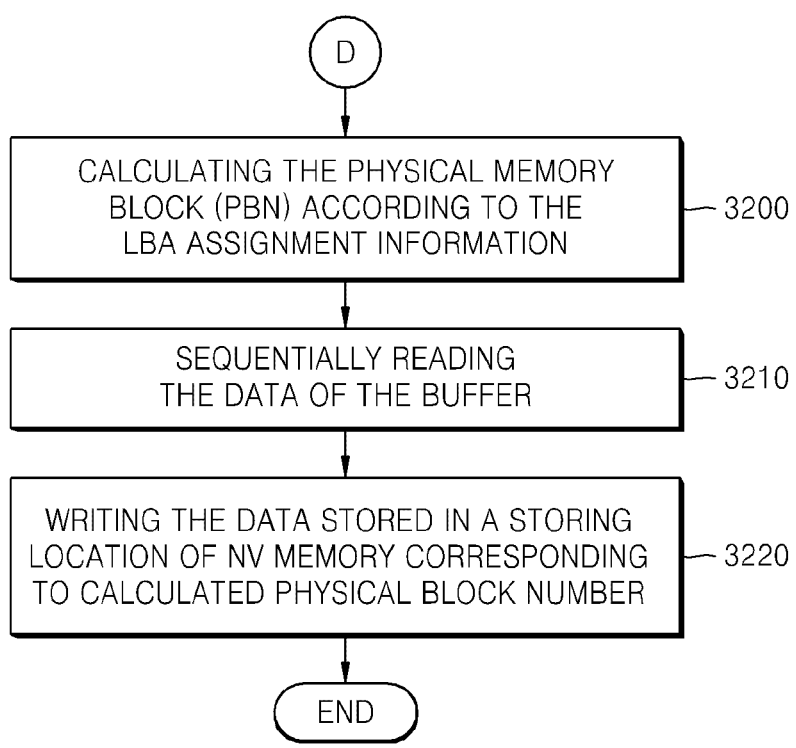

In an operation to perform a read mode illustrated in FIGS. 15A-15C, when a read command is received through the host interface 210 at operation 3002, the controller 220 refers to LBA assignment information stored in the hybrid storage apparatus 200, thereby determining at operation 3004 which one of storage apparatuses of the hybrid storage apparatus is assigned with the LBA designated in the received read command.

When the LBAs designated by the read command correspond to (or are assigned to) the hard disk apparatus of the first storage apparatus 230, the controller 220 selects the hard disk drive to perform a data read mode to read data.

That is, the HDD controller 230-2 calculates CHS values corresponding to LBAs designated by the read command according to the LBA assignment information at operation 3006, and outputs a control signal to the driver 230-3 to move the converter 16 to a target track of the disk 12 according to the calculated CHS values at operation 3008.

The driver 230-3 generates a driving current to the spindle motor 14 to rotate the disk 12 at operation 3010 and a driving current to the voice motor coil 30 at operation 3012 to move the converter 16 according to the control signal input from the HDD controller 230-2.

The converter 16 reaches the target track, information is read from a sector of the target track of the disk using the corresponding converter 16 according to the calculated CHS values at operation 3014, an electrical signal corresponding to the information is amplified in the read/write channel circuit 230-4, the amplified signal is coded into a digital signal, the digital signal is converter into stream data, and the stream data is stored in a first buffer 230-1 at operation 3016. The controller 220 sequentially reads data stored in the first buffer 230-1 at operation 3018 to transmit the read data to the host apparatus through the host interface 210 at operation 3020.

When the LBAs designated by the read command correspond to (or are assigned to) the NV memory apparatus of the first storage apparatus 230, the controller 220 selects the NV memory apparatus to perform a data read mode to read data.

That is, the NV memory controller 240-2 calculates a physical memory block (PBN) mapped by LBAs designated by the read command according to the LBA assignment information at operation 3022, and outputs a control signal to read data stored in a storing location of the NV memory 240-3 corresponding to the calculated PBN at operation 3024 and to store the read data in the second buffer 240-1 at operation 3026. The controller 220 sequentially reads the data of the second buffer 240-1 at operation 3028 to transmit the data to the host apparatus 100 through the host interface 210 at operation 3030.

In an operation 3100 to perform a write mode illustrated in FIGS. 16A-16C, a write command is received from the host apparatus 100 at operation 3110, the controller 220 refers to LBA assignment information stored in the hybrid storage apparatus 200, thereby determining which one of storage apparatuses of the hybrid storage apparatus is assigned with the LBA designated in the received write command at operation 3120.

When the LBAs designated by the write command correspond to (or are assigned to) the hard disk apparatus of the first storage apparatus 230, the controller 220 selects the hard disk drive to perform a data write mode to write data.

That is, the HDD controller 230-2 calculates CHS values corresponding to LBAs designated by the write command according to the LBA assignment information at operation 3130, and outputs a control signal to the driver 230-3 to move the converter 16 to a target track of the disk 12 according to the calculated CHS values at operation 3140.

Data is received through the host interface 210 at operation 3150, and the received data is temporarily stored in the first buffer 230-1 at operation 3160. The HDD controller 230-2 controls the first buffer 230-1 to sequentially read the temporarily stored data from the first buffer 230-1 at operation 3170 and to outputs the read data to the R/W channel circuit 230-4 at operation 3180. The R/W channel circuit 230-4 converts the data into binary data stream suitable to a write channel of the disk 12, and converts the data stream into an electrical signal to store the converted signal on the disk using the converter 16 at operation 3190.

When the LBAs designated by the read command correspond to (or are assigned to) the NV memory apparatus of the first storage apparatus 230, the controller 220 selects the NV memory apparatus to perform a data write mode to write data.

That is, the NV memory controller 240-2 calculates a physical memory block (PBN) mapped by LBAs designated by the write command according to the LBA assignment information at operation 3200. The NV controller 240-2 sequentially reads the data of the second buffer 240-1 at operation 3210 to write the data in a storing location of the NV memory 240-3 corresponding to the above-calculated physical memory block number at operation 3220.

As described above, the hard disk drive and the NV memory apparatus included in the hybrid storage apparatus can be operated as a virtual signal storage apparatus.

Figure 10:
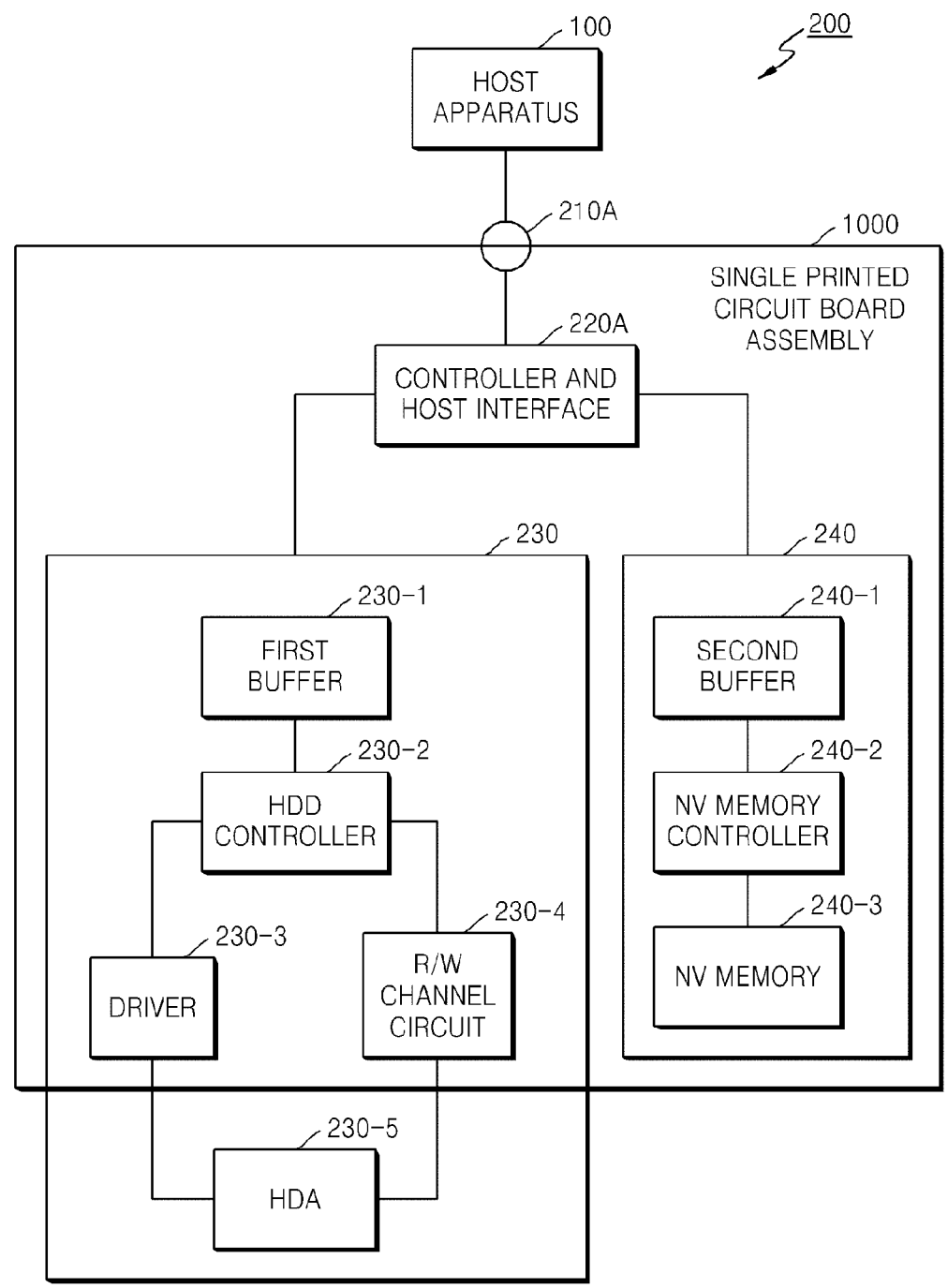
FIG. 10 illustrates a block diagram of components of a hybrid storage apparatus in accordance with exemplary embodiments of the present general inventive concept.

FIG. 10 illustrates an arrangement of components of a hybrid storage apparatus according to exemplary embodiments of the present general inventive concept.

Referring to FIG. 10, components of the hybrid storage apparatus 200 can be installed on a single printed circuit board assembly (PCBA) 1000. That is, the PCBA 1000 is mounted with a single host interface terminal 210A, a controller 220A having a host interface circuit, a first storage apparatus 230 of a hard disk drive having a first buffer 230-1, an HDD controller 230-2, a driver 230-3, a read/write channel circuit 230-4, and a second storage apparatus 240 of a non-volatile memory apparatus having a second buffer 240-1, an NV memory controller 240-2, and an NV memory 240-3.

It is possible that components (e.g., electrical circuit components) of the hybrid storage apparatus 200 can be mounted on the single PCBA 100 except the HDA 230-5 (e.g., components having mechanical elements).

The size of the hybrid storage apparatus may be reduced, for example, by arranging the components in the single PCBA 1000. The storage apparatuses of the hybrid storage apparatus may be managed or formed structurally or physically as a single apparatus to manage the circuit components. Compared to a case where components of the hybrid storage apparatus are installed on corresponding ones of separate PCBAs, manufacturing cost can be reduced.

Figure 11:
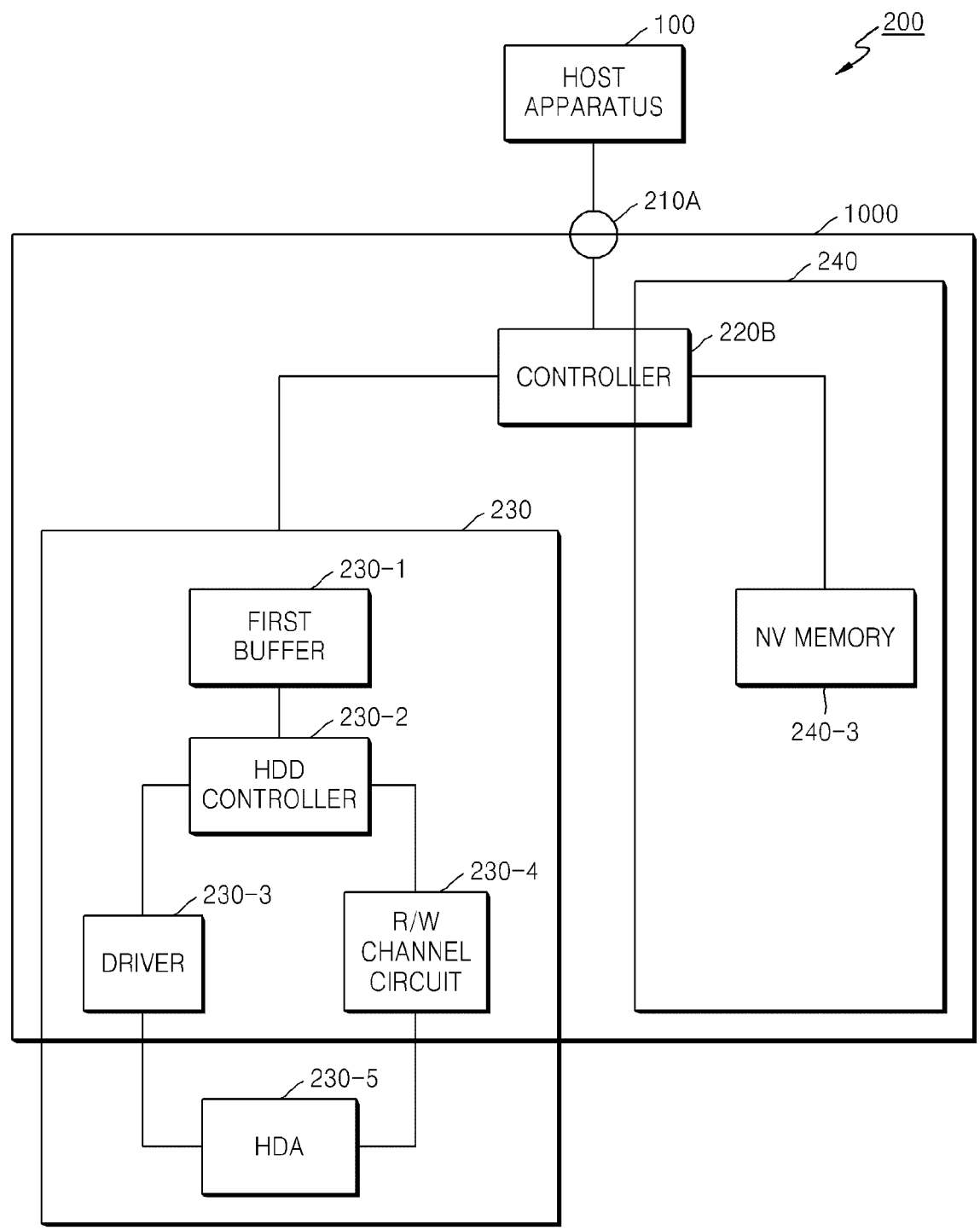
FIG. 11 illustrates a block diagram of components of a hybrid storage apparatus in accordance with exemplary embodiments of the present general inventive concept.

FIG. 11 illustrates arrangement of components (e.g., electrical circuit components) of a hybrid storage apparatus according to exemplary embodiments of the present general inventive concept. As illustrated in FIG. 11, components of the hybrid storage apparatus 200 can be installed on a single printed circuit board assembly (PCBA) 1000, where the PCBA 1000 is mounted with a single host interface terminal 210A, a controller 220A having a host interface circuit, a first storage apparatus 230 of a hard disk drive having a first buffer 230-1, an HDD controller 230-2, a driver 230-3, a read/write channel circuit 230-4, and a second storage apparatus 240 of a non-volatile memory apparatus having NV memory 240-3. In particular, FIG. 11 illustrates a single system on chip (SOC) 220B by combining the NV memory controller 240-2 and the second buffer 240-1 into a controller 220.

Referring to FIG. 11, circuit components (e.g., electrical circuit components) of the hybrid storage apparatus 200 can be mounted on the single PCBA 100 except a mechanical component of the HAD 230-5. In addition, the controller 220, the NV memory controller 240-2, the second buffer 240-1 and host interface circuit can be formed in the SOC 220B in the single PCBA 1000.

However, the present general inventive concept is not limited thereto. The circuit components included in the single SOIC can be changed in various ways. The HDD controller 230-2 and first buffer 230-1 may be included in the single SOC 220B.

Figure 14:
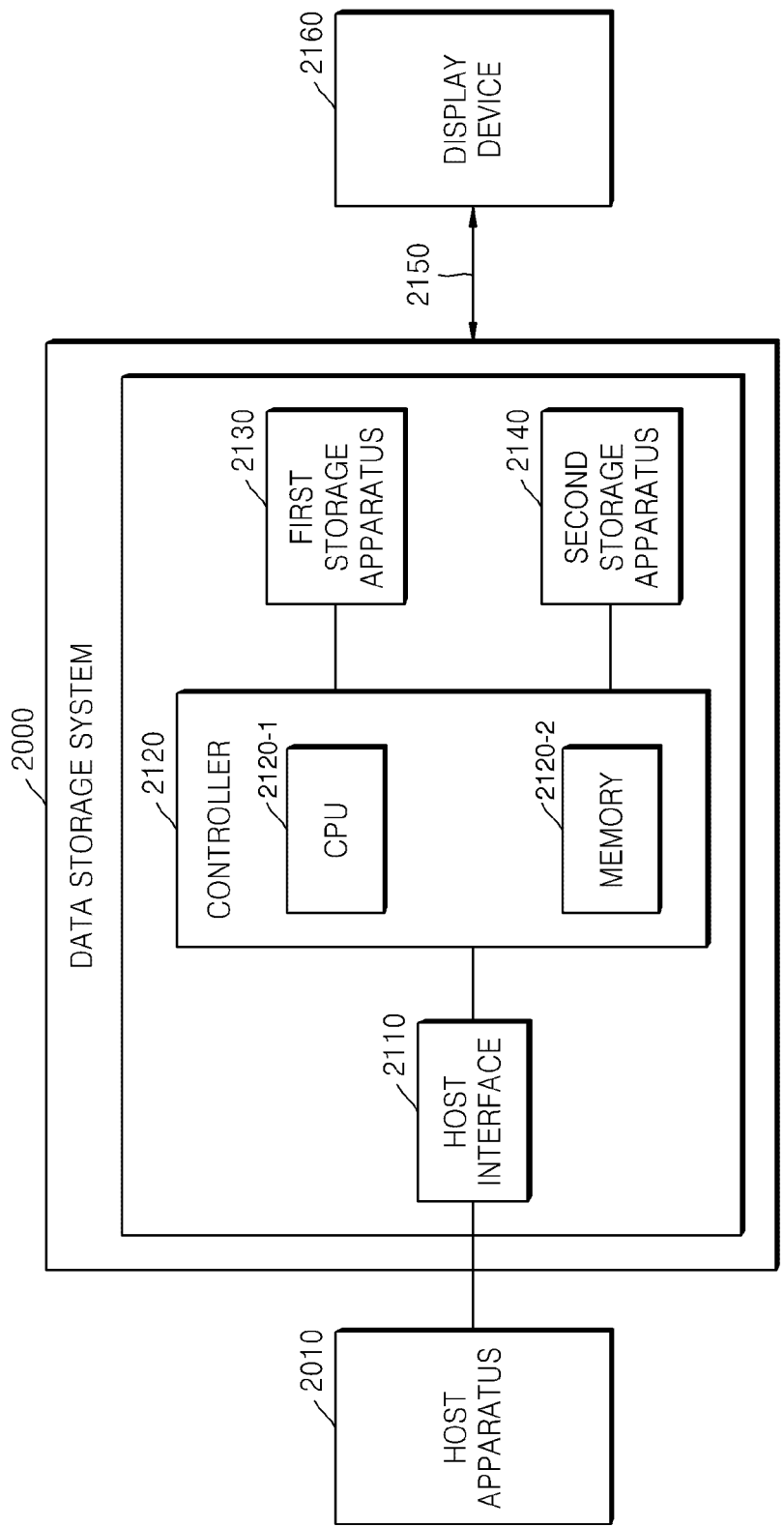
FIG. 14 illustrates a data storage system coupled to a display device via a communications transmission medium to display logical block addressing in a hybrid storage apparatus according to exemplary embodiments of the present general inventive concept.

FIG. 14 illustrates a data storage system coupled to a display device via a communications transmission medium to display logical block addressing in a hybrid storage apparatus according to exemplary embodiments of the present general inventive concept. FIG. 14 illustrates a data storage system 2000 that includes a host apparatus 2010 and a hybrid storage apparatus 2100. The data storage apparatus includes a host interface 2110, a controller 2120 that includes a CPU 2120-1 and a memory 2120-2, a first storage apparatus 2130, and a second storage apparatus 2140. The data storage system 2000 may be communicatively coupled via communication medium 2150 to a display device 2160. The communication medium 2150 may be any suitable wired or wireless communication link to transmit data between the data storage system 2000 and the display device 2160. The host apparatus 2010 and the components of the hybrid storage apparatus 2100 (e.g., the host interface 2110, the controller 2120, the first storage apparatus 2130, and the second storage apparatus 2140) may operate similarly to the host apparatus 100 and the components of the hybrid storage apparatus 200 illustrated, for example, in FIG. 1 and described above.

The display device 2160 may display operations being performed or having been completed by the data storage system 2000 for a user or maintenance operator to view. The data storage system 2000 may also transmit a signal via transmission medium 2150 to the display device 2160 for display to indicate a determination of which storage apparatus (e.g., the first storage apparatus 2130, the second storage apparatus 2140, a hard disk drive, a non-volatile memory, etc.) is assigned with the LBA designated in a received read command or write command from the host apparatus (e.g., host apparatus 2010). The display device may display that one or more of operations of assigning logical block addresses illustrated in FIG. 7 are being performed or have been completed. The display device 2160 may display one or more operations of the read operation 3000 illustrated in FIGS. 15A-15C are being performed or have been completed. Similarly, the display device 2160 may display one or more operations of the write operation 3100 illustrated in FIGS. 16A-16C are being performed or have been completed.

According to the present general inventive concept, a size and manufacturing cost of the hybrid storage apparatus can be reduced. Reliability of the hybrid storage apparatus can be improved and increased.

The present general inventive concept can provide a method, an apparatus, and a system. When being performed using a program, the respect circuit components may correspond to code segments to perform operations of circuit components necessary in the hybrid storage apparatus.

The present general inventive concept may be implemented a computer-readable medium, such as a computer-readable recording medium and a computer-readable transmission medium. The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although several embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A memory device storing instructions that, when executed by a computer, performs a method comprising:
    searching and detecting at least one of a first data storage apparatus and one or more second data storage apparatuses included in a data storage device when a set condition occurs;
    assigning a first set of logic block addresses to the first data storage apparatus;
    assigning a second set of logic block addresses to the one or more second data storage apparatuses, wherein the first data storage apparatus and the one or more second data storage apparatuses are accessed as a sequentially-addressed single storage apparatus;
    copying a system file stored in a first system file area of the first data storage apparatus into a specific area of the one or more second data storage apparatuses as back-up data; and
    copying the system file from the specific area to a second system file area of the one or more second data storage apparatuses when the system file is not detected in the first data storage apparatus.

2. The memory device of claim 1, further comprising:
    detect the first data storage apparatus and the one or more second data storage apparatuses when a set condition occurs;
    when only one of the first data storage apparatus and one or more second data storage apparatuses is detected, entering a mode comprising:
        determining if the system file is stored in a system file area of a detected storage apparatus;
        copying the system file stored in the specific area of the detected storage apparatus into the system file area if a determination is made that the system file is not stored in the system file area of the detected storage apparatus; and
        assigning or reassigning one or more logic block addresses to the detected storage apparatus, based on logic block addresses previously assigned to a nondetected storage apparatus and whether the system file was copied to the system file area.

3. The memory device of claim 2, wherein the set condition comprises a condition where the data storage device is changed from a power off state to a power on state.

4. The memory device of claim 2, wherein the set condition comprises a condition where the data storage device is reset.

5. The memory device of claim 1, wherein the assigning comprises assigning the first set of logic block addresses to storing areas of a nonvolatile semiconductor memory apparatus and sequentially assigning the second set of logic block addresses to storing areas of a hard disk drive such that a first one of the second set of logic block addresses is a next one of the last address of the first set of logic block addresses.

6. The memory device of claim 1, wherein the first data storage apparatus has a first storage capacity and a first access data rate, and the one or more second data storage apparatuses has a second storage capacity greater than the first storage capacity and a second access data rate that is less than the first access data rate, and wherein the method further comprises:
where an assigned last logical block address of the first data storage apparatus is N, and a first assigned logical block address of the second data storage apparatus is N+1.

7. The memory device of claim 1, the method further comprising:
when only one of the first data storage apparatus and the one or more second data storage apparatuses is detected, copying the system file stored in a specific area of the detected data storage apparatus into a system file area of the detected data storage apparatus when the system file is not stored in the system file area, and assigning new logical block addresses to the detected data storage apparatus.

8. The memory device of claim 7, the method further comprising:
storing the newly assigned logical block addresses on the detected data storage apparatus.

9. An apparatus, comprising:
a data storage apparatus including:
a first storage device having a first operation response time;
a second storage device having a second operation response time faster than the first operation response time;
a storage controller configured to:
receive data access operation requests from a host device;
control the assignment of unique logical block addresses to the first storage device and the second storage device;
copy system information stored in a system file area of the second storage device into a specific area of the first storage device;
configure a selected area of the first storage device to act as a substitute system file area when the system file area of the second storage device cannot be used; and
copy the system information from the specific area to the substitute system file area.

10. The apparatus of claim 9, further comprising:
the first storage device including a first storage device controller;
the second storage device including a second storage device controller;
and wherein the storage controller is further configured to control the first storage device controller and the second storage device controller.

11. The apparatus of claim 9, the storage controller further configured to:
detect the first storage device and the second storage device at a trigger event; and
when only the first storage device is detected, copy system information stored in the specific area of the first storage device to the substitute system file area of the first storage device.

12. An apparatus comprising:
a first data storage medium;
at least one second data storage medium, the first data storage medium and the at least one second data storage medium having different writing methods;
a controller configured to:
assign a first set of logic block addresses to the first data storage medium;
assign a second set of logic block addresses to the at least one second data storage medium;
copy system information from the first data storage medium to a specific area of the at least one second data storage medium; and
copy the system information from the specific area to a reserved system area of the at least one second data storage medium when the system information is not detected in the first data storage medium.

13. The apparatus of claim 12, wherein the first data storage medium has a data transmission speed higher than the at least one second data storage medium.

14. The apparatus of claim 12, wherein the first data storage medium and the at least one second data storage medium comprise non-volatile storage apparatuses.

15. The apparatus of claim 12, wherein the at least one second data storage medium comprises a hard disk drive and the first data storage medium comprises a non-volatile semiconductor memory apparatus.

16. The apparatus of claim 15, wherein the controller assigns the first set of logic block addresses to the first data storage medium and sequentially assigns the second set of logic block addresses to the at least one second data storage medium such that a first one of the second set of logic block addresses sequentially follows a last one of the first set of logic block addresses.

17. The apparatus of claim 15, wherein the controller assigns the first set of logic block addresses to the non-volatile semiconductor memory apparatus by mapping physical memory blocks of the non-volatile semiconductor memory apparatus with virtual logic block addresses.

18. The apparatus of claim 15, wherein the controller assigns the second set of logic block addresses to the hard disk drive by mapping location information of sectors included in the hard disk drive with virtual logic block addresses.

19. The apparatus of claim 12, further comprising an interface to connect to a host such that the apparatus appears to the host as a single data storage device.

20. The apparatus of claim 12, wherein the controller is further configured to:
detect the first data storage medium and the at least one second data storage medium at a trigger event;
determine whether the system information exists in an expected location; and
when the system information is not stored in the expected location, copy the system information stored in the specific area of the at least one second data storage medium to the reserved system area.

21. The apparatus of claim 20, further comprising when the controller does not detect a data storage medium having system information in the expected location, the controller assigns one or more logic block addresses to detected storage mediums such that the expected location is reassigned to an area of the detected data storage mediums.

22. The apparatus of claim 12, further comprising:
an interface to receive and transmit data between a host apparatus and the interface.

23. The apparatus of claim 12, wherein the first data storage medium and the at least one second data storage medium comprise a plurality of circuit elements mounted on a single circuit board.

24. The apparatus of claim 12, further comprising a storage medium controller to control storing data to at least one of the first data storage medium or the at least one second data storage medium, wherein the controller and the storage medium controller are formed as a single system on chip.

25. The apparatus of claim 12, further comprising:
a processor to output data; and
the controller further configured to receive output data from the processor and to assign addresses from the first set of logic block addresses to data to be stored in the first data storage medium and to assign addresses from the second set of logic block addresses to data to be stored in the second data storage medium.

* * * * *